(12) United States Patent
Yamaguchi et al.

(10) Patent No.: US 7,519,656 B2
(45) Date of Patent: Apr. 14, 2009

(54) INFORMATION PROCESSING SYSTEM, INFORMATION PROCESSING APPARATUS, INFORMATION PROCESSING METHOD, STORAGE MEDIUM THAT STORES PROGRAM FOR IMPLEMENTING THAT METHOD TO BE READABLE BY INFORMATION PROCESSING APPARATUS, AND PROGRAM

(75) Inventors: Kotaro Yamaguchi, Tokyo (JP); Kenji Maeda, Kanagawa (JP); Makoto Kobayashi, Tokyo (JP); Jin Sunata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 603 days.

(21) Appl. No.: 10/389,987

(22) Filed: Mar. 18, 2003

(65) Prior Publication Data

US 2003/0181199 A1     Sep. 25, 2003

(30) Foreign Application Priority Data

Mar. 19, 2002   (JP)   ............................. 2002-077075

(51) Int. Cl.
   *G06F 15/16*   (2006.01)
(52) U.S. Cl. .................. 709/203; 709/223; 709/224; 709/226; 709/232; 709/246; 709/247
(58) Field of Classification Search ................. 709/223, 709/224, 203, 226, 232, 217, 246, 247
   See application file for complete search history.

(56) References Cited

U.S. PATENT DOCUMENTS 4,503,427 A  *  3/1985  Iida ............................. 345/667

(Continued)

FOREIGN PATENT DOCUMENTS

DE    198 06 508 A1    8/1999

(Continued)

OTHER PUBLICATIONS

Patent Abstracts of Japan, vol. 2002, No. 2, Apr. 2, 2002 (JP 2001-282688).

(Continued)

*Primary Examiner*—Ario Etienne
*Assistant Examiner*—Barbara N Burgess
(74) *Attorney, Agent, or Firm*—Fitzpatrick, Cella, Harper & Scinto

(57) ABSTRACT

This invention relates to a service which manages data using an information processing server on a network and allows another user to browse the managed data in accordance with an instruction from a data owner. Also, this invention particularly relates to a case wherein a terminal that the other user uses to browse the managed data is a compact information processing apparatus such as a mobile phone or the like. Upon providing the managed data and appended data associated with the managed data to a terminal of the other user, the information processing server changes the appended data and a method of providing the appended data in correspondence with the performance of the terminal of the other user. For example, upon displaying image data on a mobile phone of the other user, if message information associated with that image data has a large information size and cannot be fully displayed on the mobile phone of the other user, the information processing server changes the message information to shorter information, and provides the changed information to the mobile phone of the other user. The server causes the mobile phone of the other user to display a link to full message information, and allows it to receive the message information by accessing that link.

5 Claims, 39 Drawing Sheets

U.S. PATENT DOCUMENTS

| | | | |
|---|---|---|---|
| 5,153,744 A | 10/1992 | Nobuta | |
| 5,339,169 A | 8/1994 | Meguro | |
| 5,633,678 A * | 5/1997 | Parulski et al. | 348/231.5 |
| 5,804,803 A | 9/1998 | Cragun | |
| 6,085,230 A | 7/2000 | Ryuutou | |
| 6,085,249 A | 7/2000 | Wang | |
| 6,088,131 A | 7/2000 | Imai et al. | 358/450 |
| 6,148,333 A | 11/2000 | Guedalia | |
| 6,251,016 B1 | 6/2001 | Tsuda | |
| 6,269,173 B1 | 7/2001 | Hsien | |
| 6,301,018 B1 | 10/2001 | Maeda et al. | 358/449 |
| 6,307,640 B1 | 10/2001 | Motegi | |
| 6,307,641 B1 | 10/2001 | Hamano | |
| 6,324,521 B1 | 11/2001 | Shiota | |
| 6,389,181 B2 | 5/2002 | Shaffer | |
| 6,424,429 B1 | 7/2002 | Takahashi | |
| 6,631,495 B2 | 10/2003 | Kato | |
| 6,670,968 B1 | 12/2003 | Schilit et al. | 345/760 |
| 6,798,533 B2 * | 9/2004 | Tipirneni | 358/1.15 |
| 6,806,976 B1 | 10/2004 | Suyehira | |
| 6,809,724 B1 * | 10/2004 | Shiraishi et al. | 345/169 |
| 6,862,103 B1 | 3/2005 | Miura | |
| 7,068,309 B2 | 6/2006 | Toyama | |
| 7,080,124 B1 | 7/2006 | Shankar | |
| 2001/0035976 A1 | 11/2001 | Poon | |
| 2001/0035980 A1 | 11/2001 | Kawabata | |
| 2002/0026511 A1 | 2/2002 | Garcia-Luna-Aceves | |
| 2002/0030699 A1 * | 3/2002 | Van Ee | 345/810 |
| 2002/0078242 A1 * | 6/2002 | Viswanath | 709/247 |
| 2002/0135801 A1 | 9/2002 | Tessman, Jr. | |
| 2002/0156923 A1 * | 10/2002 | Tanimoto | 709/246 |
| 2002/0180764 A1 * | 12/2002 | Gilbert et al. | 345/660 |
| 2003/0093321 A1 | 5/2003 | Bodmer et al. | |
| 2003/0107760 A1 | 6/2003 | King | |
| 2003/0181199 A1 | 9/2003 | Yamaguchi | |
| 2003/0220995 A1 | 11/2003 | Hitaka | |
| 2004/0044747 A1 | 3/2004 | Trevor et al. | 709/217 |

FOREIGN PATENT DOCUMENTS

| | | |
|---|---|---|
| DE | 101 17 457 A1 | 10/2002 |
| EP | 0 852 440 | 7/1998 |
| EP | 1 052 598 A2 | 11/2000 |
| JP | 2001-238155 | 8/2001 |
| JP | 2001-290787 | 10/2001 |
| JP | 2001-290834 | 10/2001 |
| JP | 2001-313749 | 11/2001 |
| JP | 2002-73464 | 3/2002 |
| JP | 10-079927 | 10/2007 |
| WO | 01/22299 | 3/2001 |
| WO | WO 01/37260 A1 | 5/2001 |
| WO | WO 01/71651 A1 | 9/2001 |
| WO | 01/86511 | 11/2001 |

OTHER PUBLICATIONS

U.S. Appl. No. 09/487,720, filed Jan. 19, 2000, now abandoned.

"An Image Search Device For Searching The Web, A Treasure House Of Documents." Hiroshi Imaizumi, Internet Magazine, Japan, Impress Corp., Jan. 1, 1999, 48th edition, p. 286-287.

* cited by examiner

FIG. 4

CUSTOMER INFORMATION DATA TABLE 400

| ITEM | TYPE | |
|---|---|---|
| USER ID | INTEGER TYPE | ~401 |
| DESTINATION E-MAIL ADDRESS | CHARACTER TYPE 64 BYTES | ~402 |
| Login Name | CHARACTER TYPE 64 BYTES | ~403 |
| Password | CHARACTER TYPE 64 BYTES | ~404 |
| NAME (LAST NAME) | CHARACTER TYPE 64 BYTES | ~405 |
| NAME (FIRST NAME) | CHARACTER TYPE 64 BYTES | ~406 |
| FURIGANA NAME (LAST NAME) | CHARACTER TYPE 64 BYTES | ~407 |
| FURIGANA NAME (FIRST NAME) | CHARACTER TYPE 64 BYTES | ~408 |
| POSTAL CODE 1 | CHARACTER TYPE 8 BYTES | ~409 |
| POSTAL CODE 2 | CHARACTER TYPE 8 BYTES | ~410 |
| PREFECTURE CODE | INTEGER TYPE | ~411 |
| ADDRESS 1 | CHARACTER TYPE 256 BYTES | ~412 |
| ADDRESS 2 | CHARACTER TYPE 256 BYTES | ~413 |
| PHONE NUMBER 1 | CHARACTER TYPE 8 BYTES | ~414 |
| PHONE NUMBER 2 | CHARACTER TYPE 8 BYTES | ~415 |
| PHONE NUMBER 3 | CHARACTER TYPE 8 BYTES | ~416 |
| USER REGISTRATION STATE | INTEGER TYPE | ~417 |

FIG. 5

CUSTOMER STATE DATA TABLE 500

| ITEM | TYPE | |
|---|---|---|
| USER ID | INTEGER TYPE | ~501 |
| LAST DISPLAYED ALBUM ID | INTEGER TYPE | ~502 |
| DISK USE LIMIT SIZE | INTEGER TYPE | ~503 |
| ACCUMULATED POINTS | INTEGER TYPE | ~504 |

FIG. 6

CUSTOMER ALBUM DATA TABLE  600

| ITEM | TYPE | |
|---|---|---|
| USER ID | INTEGER TYPE | 601 |
| ALBUM ID | INTEGER TYPE | 602 |
| ALBUM DISPLAY ORDER NUMBER | INTEGER TYPE | 603 |

FIG. 7

ALBUM INFORMATION DATA TABLE 700

| ITEM | TYPE | |
|---|---|---|
| USER ID | INTEGER TYPE | 701 |
| ALBUM NAME | CHARACTER TYPE 64 BYTES | 702 |
| COMMENT FILE PATH | CHARACTER TYPE 256 BYTES | 703 |
| PUBLICATION ALLOWABILITY | INTEGER TYPE | 704 |
| PASSWORD CERTIFICATION | INTEGER TYPE | 705 |
| ALBUM PASSWORD | CHARACTER TYPE 64 BYTES | 706 |
| PRINT ALLOWABILITY | INTEGER TYPE | 707 |
| ORIGINAL DISPLAY ALLOWABILITY | INTEGER TYPE | 708 |
| DISPLAY MODE NUMBER | INTEGER TYPE | 709 |
| BROWSE INHIBITION | INTEGER TYPE | 710 |
| BROWSE COUNT | INTEGER TYPE | 711 |
| MOBILE BROWSE COUNT | INTEGER TYPE | 712 |

FIG. 8

ALBUM IMAGE DATA TABLE 800

| ITEM | TYPE | |
|---|---|---|
| ALBUM ID | INTEGER TYPE | ~801 |
| IMAGE ID | INTEGER TYPE | ~802 |
| IMAGE DISPLAY NUMBER | INTEGER TYPE | ~803 |

FIG. 9

IMAGE INFORMATION DATA TABLE 900

| ITEM | TYPE | |
|---|---|---|
| IMAGE ID | INTEGER TYPE | 901 |
| USER ID | INTEGER TYPE | 902 |
| IMAGE NAME | CHARACTER TYPE 64 BYTES | 903 |
| ORIGINAL IMAGE FILE PATH | CHARACTER TYPE 256 BYTES | 904 |
| THUMBNAIL FILE PATH | CHARACTER TYPE 256 BYTES | 905 |
| DISPLAY IMAGE FILE PATH | CHARACTER TYPE 256 BYTES | 906 |
| COMMENT FILE PATH | CHARACTER TYPE 256 BYTES | 907 |
| BROWSE COUNT | INTEGER TYPE | 908 |
| PRINT COUNT | INTEGER TYPE | 909 |
| MOBILE BROWSE COUNT | INTEGER TYPE | 910 |
| BROWSE INHIBITION | INTEGER TYPE | 911 |

FIG. 24

```
Date : Sat. 23 Jun 2001 02:34:56+0900
From : PhotoSite <△△△@eanon.co.jp>
To : aaa@○○.ne.jp
Subject : PUBLIC ALBUM NOTIFICATION
Error-to : △△△@eanon.co.jp
Content-Type : text/plain ; charset = "ISO-2022-JP"
Content-Transfer-Encoding : 7bit YOU CAN BROWSE PUBLIC ALBUM OF PHOTO SITE AT FOLLOWING URL.  ～2401
http://www.○○○.com/PhotoSite/UserAlbum/AlbumEntry.cgi?AlbumID = AJNWDMF
OR YOUR CAN BROWSE ALBUM BY DESIGNATING FOLLOWING NUMBER
IN ALBUM ID AT
http://○○○.com/PhotoSite/.
ALBUM ID: AJNWDMF ～2402

-SENDER'S MESSAGE-
DEAR CUSTOMER,
PHOTOS TAKEN AT OUR ITEM BRIEFING THE OTHER DAY HAVE BEEN UPLOADED.
PLEASE GIVE US YOUR FEEDBACK AFTER YOU BROWSE THEM.
-END OF MESSAGE-
```

FIG. 34

MB SESSION INFORMATION TABLE 3400

| ITEM | TYPE | |
|---|---|---|
| SESSION ID | INTEGER TYPE | ~3401 |
| LAST ACCESS DATE & TIME | CHARACTER TYPE 64 BYTES | ~3402 |
| ACCESS DATE & TIME | CHARACTER TYPE 64 BYTES | ~3403 |
| USER ID | INTEGER TYPE | ~3404 |
| RECORD ATTRIBUTE | CHARACTER TYPE 1 BYTE | ~3405 |

FIG. 35

MB ALBUM INFORMATION TABLE           3500

| ITEM | TYPE |
|---|---|
| SESSION ID | INTEGER TYPE |
| ALBUM ID | INTEGER TYPE |
| ALBUM NAME | CHARACTER TYPE 64 BYTES |
| ALBUM COMMENT | CHARACTER TYPE 256 BYTES |

MB IMAGE INFORMATION TABLE    3600

| ITEM | TYPE | |
|---|---|---|
| SESSION ID | INTEGER TYPE | 3601 |
| IMAGE ID | INTEGER TYPE | 3602 |
| ALBUM ID | INTEGER TYPE | 3603 |
| IMAGE NAME | CHARACTER TYPE 64 BYTES | 3604 |
| IMAGE COMMENT PATH | CHARACTER TYPE 256 BYTES | 3605 |
| IMAGE PATH | CHARACTER TYPE 256 BYTES | 3606 |
| IMAGE NUMBER | INTEGER TYPE | 3607 |

INFORMATION PROCESSING SYSTEM, INFORMATION PROCESSING APPARATUS, INFORMATION PROCESSING METHOD, STORAGE MEDIUM THAT STORES PROGRAM FOR IMPLEMENTING THAT METHOD TO BE READABLE BY INFORMATION PROCESSING APPARATUS, AND PROGRAM

FIELD OF THE INVENTION

The present invention relates to an information processing system, information processing apparatus, and information processing method, which are used in a data service that provides data stored in an information processing apparatus on a network to another information processing apparatus (especially, a compact information processing apparatus such as a mobile phone), a storage medium that stores a program for implementing that method to be readable by an information processing apparatus, and a program. The data can include an image data and the other various contents.

BACKGROUND OF THE INVENTION

Along with the development of communication infrastructures and progress of information communication technologies, information services using the Internet are available.

As one of such information services, an image browse service which keeps user's image data in a storage area of a server on the Internet by an image service site (to be referred to as a photo site hereinafter), and publishes the image data at a desired timing of the user is known.

Since a compact apparatus such as a mobile phone terminal has a small display unit, the information size that the terminal can display is limited. Also, the information size that can be transmitted via a mobile phone communication is limited by a communication provider. For this reason, when an image with a large information size is to be published to a mobile phone terminal, the mobile phone terminal cannot often display or receive image data, and no data can often be displayed on the display of the mobile phone terminal.

In an image browse service, since image information is managed for each image browse request from the user, the size of management data of user information, image information, and the like becomes huge as the number of users and the number of images increase, and user and image search processes and their information processes take much time.

SUMMARY OF THE INVENTION

It is an object of the present invention to provide an information processing system, information processing apparatus, and information processing method, which manage data to be provided and appended data associated with the data, and change the appended data and a service method of the appended data in correspondence with the performance of a user terminal that receives a service, a storage medium that stores a program for implementing that method to be readable by an information processing apparatus, and a program.

In order to achieve the above objects, the present invention provides an information processing apparatus for providing data for a communication terminal, comprising: reception means for receiving a request of data from the communication terminal; acquisition means for acquiring appended data associated with the requested data; modification means for modifying the appended data to be a predetermined data size; and output means for outputting the modified appended data and the data.

The apparatus further comprises: management means for managing data sizes for respective models of communication terminals; and detection means for detecting model information of the communication terminal issuing the request, and the predetermined data size is determined on the basis of the data sizes managed by said management means and the model information of the communication terminal detected by said detection means.

The appended data includes at least one of a file name of the requested data, a comment to the data, an owner name of the data, and the number of viewers of the data. The modification process of said modification means extracts data of the predetermined data size from the appended data. The apparatus further comprises determination means for determining whether a sequence of the data included in the appended data is formed of 2-byte or 1-byte units, and the modification process of said determination means extracts data of a data size different from the predetermined data size from the appended data in accordance with the determination result. The apparatus further comprises: copy means for generating copy information by copying the data and the appended data; and session management means for issuing a session ID for first access from the communication terminal, and managing the session ID and the generated copy information in association with each other, and said acquisition means acquires the appended data from the copy information. The apparatus further comprises response means for returning the request appended with the session ID in response to the request from the communication terminal.

The present invention also provides an information processing method for providing data for a communication terminal, comprising the steps of: receiving a request of data from the communication terminal; acquiring appended data associated with the requested data; modifying the appended data to be a predetermined data size; and outputting the modified appended data together with the data.

The present invention also provides a program for making a computer execute above information processing method and a storage medium for computer-readably storing the program.

The present invention further provides an information processing system which provides data for a communication terminal using a plurality of information processing apparatuses, comprising: reception means for receiving a request of data from the communication terminal; acquisition means for acquiring appended data associated with the requested data; modification means for modifying the appended data to be a predetermined data size; and output means for outputting the modified appended data and the data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 shows a customer information data table managed at the photo site according to the embodiment of the present invention;

FIG. 5 shows a customer state table managed at the photo site according to the embodiment of the present invention;

FIG. 6 shows a customer album data table managed at the photo site according to the embodiment of the present invention;

FIG. 7 shows an album information data table managed at the photo site according to the embodiment of the present invention;

FIG. 8 shows an album image data table managed at the photo site according to the embodiment of the present invention;

FIG. 9 shows an image information table managed at the photo site according to the embodiment of the present invention;

FIG. 24 shows an example of an album notification mail message according to the embodiment of the present invention;

FIG. 34 shows an example of a mobile session information table according to the embodiment of the present invention;

FIG. 35 shows an example of a mobile album information table according to the embodiment of the present invention;

FIG. 36 shows an example of a mobile image information table according to the embodiment of the present invention;

DESCRIPTION OF THE PREFERRED EMBODIMENTS

Preferred embodiments of the present invention will be exemplified in detail hereinafter with reference to the accompanying drawings. Note that the relative layout of building components, display dialogs, and the like described in the embodiments do not limit the scope of the present invention to only them unless otherwise specified, and their modifications, and examples including/excluding them are also included in the present invention.

As an embodiment of the present invention, an information service system which shares and provides digital image data via the Internet will be exemplified.

<Outline of Information Service System of this Embodiment>

Figure 1:
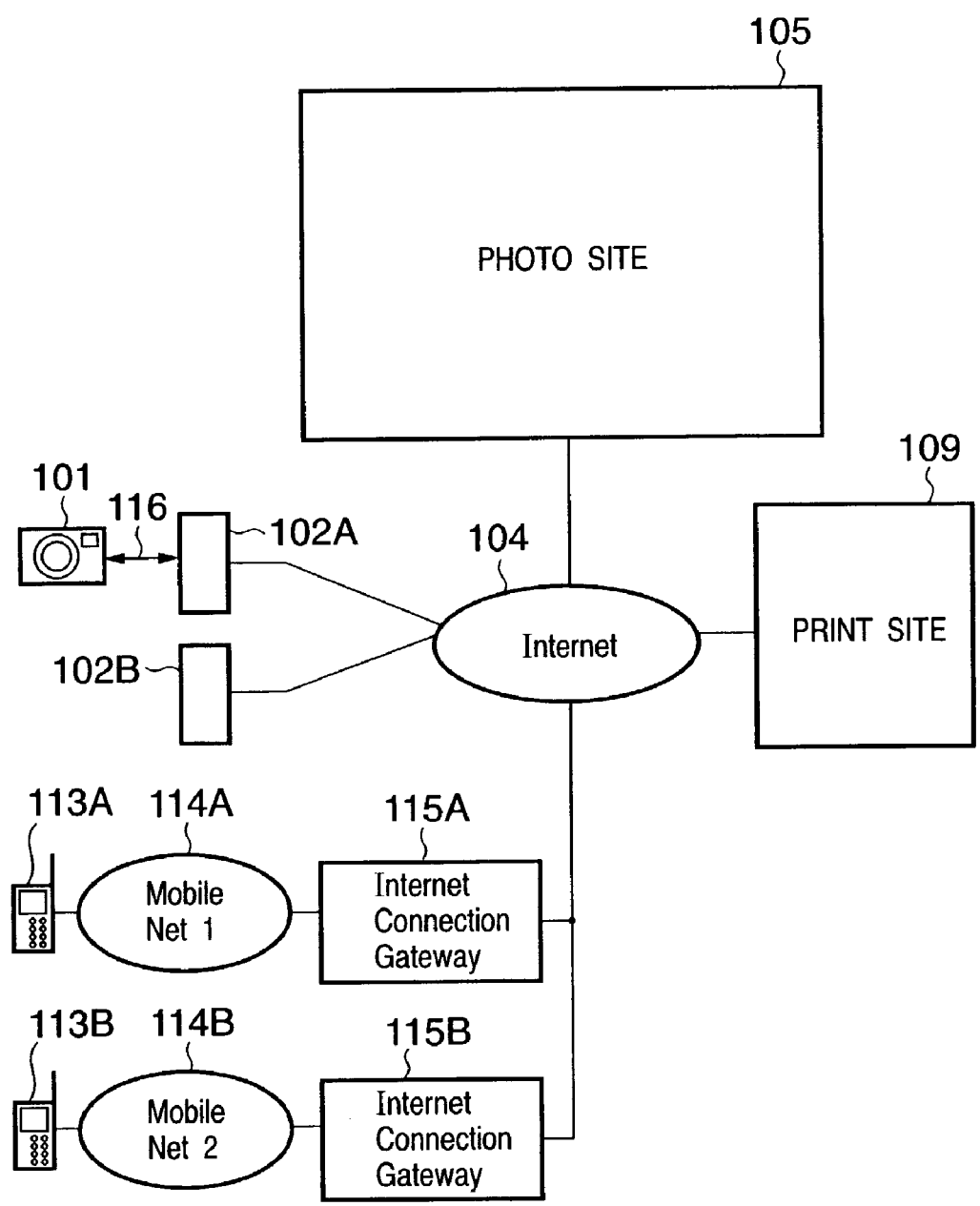
FIG. 1 is a schematic diagram showing the arrangement of the overall information service system according to an embodiment of the present invention.

FIG. 1 shows an example of the arrangement of an information service system according to this embodiment.

An information service system includes personal computers (PCs) 102 of users who receive a service, mobile terminals 113, a photo site 105 that manages users' images and personal information, and a print site 109 that executes print processes of images managed at the photo site 105.

The photo site 105 provides a service which keeps image data sensed by the user using an image input device 101 in a storage area of a server on the Internet 104, and publishes the image data at a desired of the user (to be also referred to as an album owner hereinafter) to the user or a partner designated by that user. The photo site 105 according to this embodiment does not provide any print services by itself, and sends print order requests to the print site 109 that can provide various print services in cooperation with the print site 109. The print site 109 prints out digital documents such as new year greeting cards, word processor documents, images, and the like, which are transferred using the Internet 104, and provides printouts as commodities to the user and the like.

Each user accesses the photo site 105 using a Web browser, which runs on the user PC 102, and sends a browse request of images saved at the photo site 105. The photo site 105 allows to display images on the Web browser which runs on the user PC under a given condition. The user can select an image that he or she wants to print out from those browsed on the Web browser. Identification information of the selected image is passed from the photo site 105 to the print site 109.

(Image Upload)

Referring to FIG. 1, reference numeral 101 denotes an image input device which converts an optical image as image information into an electrical signal, executes a predetermined image process, and then records/plays back the image as digital information. The image input device can be either a digital still camera that can sense a still image and can record it as image data, or a digital video camera that can capture a moving image, and can record it as moving image data.

A data transfer interface 116 is used to transfer sensed image data between the image input device 101 and user PC 102. The data transfer interface 116 may adopt either a wired interface represented by Universal Serial Bus (USB) and IEEE1394, or a wireless interface represented by Infrared Data Association (IrDA) and Bluetooth.

Image data which is sensed by the image input device 101 and is stored as digital information is transferred to a storage area of an information storage device such as a Hard Disk Drive (HDD) of the user PC 102 via this data transfer interface 116. As for image data transfer from the image input device 101 to the user PC 102, image data stored in the information storage device in the image input device 101 are simultaneously transferred in response to a command from an Operating System (OS) or dedicated software installed in a user PC 102A, or the OS or dedicated software which runs on the user PC 102 assures a data recording area on an information recording unit of the user PC 102 and transfers image data to that area.

On the user PC 102, a Web browser having a standard protocol capable of information transfer on the Internet 104 can run. With this Web browser, the user accesses the photo site 105 using a standard protocol such as a Hyper Text Transfer Protocol (http protocol) or the like, and display Web information, which is created using a description language such as a Hyper Text Markup Language (HTML), extensible Markup Language (XML), or the like. This Web information links to with multimedia information such as image data, audio data, and the like managed at the photo site 105. With this operation, the user of the user PC 102 can receive services provided by the photo site 105 via the Internet 104.

Image data, which is sensed by the image input device 101 and stored in the information storage area of the user PC 102, is transferred to the photo site 105 in response to a user's request from the user PC 102 (this transfer will be referred to as image upload hereinafter). The image upload method includes a method in which image data to be transferred is selected from the aforementioned Web browser and is transferred in synchronism with an image upload request action, and a method in which image data is selected using image upload dedicated software or the like, and is directly transferred. Both these methods are implemented based on a protocol such as http, File Transfer Protocol (ftp), or the like, which can be used on the Internet.

It is then checked if the uploaded image data is data that the photo site server 105 can use. If it is determined that the photo site 105 can use the uploaded data, the uploaded image data, property information, and the like are stored. The photo site 105 can manage a plurality of uploaded image data as an album as a management unit of such data.

In this stage, the photo site 105 notifies the user PC 102 that image data has been successfully uploaded.

The user of the user PC 102 can upload image data in this way via the Web browser.

The photo site 105 simultaneously manages various data in addition to the property information of image data. For example, the photo site 105 manages data of user property information registered in advance, print site property information to which a printout request of the uploaded image data is to be sent, and the like.

Note that the PC has been exemplified as a terminal that uploads an image. However, the information service system according to the present invention is not limited to such specific terminal, and images may be uploaded from the mobile terminal 113 (e.g., a mobile phone), or may be directly uploaded from an image input device such as a digital still camera, digital video camera, scanner, copying machine, or the like via wired or wireless communications.

(Image Browse Service)

A method that allows a user other than the user who uploaded image data to the photo site 105 to browse image data will be explained below.

The photo site 105 provides a browse service of an uploaded image or an album that manages a plurality of uploaded images as one archive to a third party designated by the upload user. The user who uploaded image data to the photo site 105 notifies the photo site 105 of an e-mail address of a user to whom the upload user grants a permission to browse (to be referred to as a browse user hereinafter) via the Web browser.

Upon publishing images to the browse user, the photo site 105 generates a Universal Resource Locator (URL) required to publish them. At this time, a unique address which uses a random number or the like that cannot be uniquely estimated is assigned to the URL to be generated (such URL that cannot be uniquely estimated will be referred to as a random URL hereinafter). An example of such URL is: http://_____.com/PhotoSite/Album/AlbumEntry.cgi?AlbumID=AJNWDMF The photo site server 105 sends the random URL generated in this way to the browse user as an e-mail message via the Internet 104 while appending password information required to browse if necessary. Upon reception of the e-mail message, the browse user can browse images or albums designated by the user who uploaded images by accessing the Internet 104 from, e.g., a user PC 102B, and inputting the random URL described in the e-mail message to the Web browser.

Also, the photo site server 105 can provide browse notification and browse function services of images (or albums) to the owner of a mobile terminal designated by the user who uploaded images. In this case, the photo site 105 sends an e-mail message to the mobile terminal 113 as in the e-mail message sent to the browse user. Upon receiving the e-mail message, a user (a user who accesses the photo site 105 using the mobile terminal 113 will be referred to as a mobile terminal user hereinafter) can similarly browse images and albums.

The e-mail message addressed to the mobile terminal user is sent from a mail server in the photo site 105 to a mobile network 114A that can exchange various data with a mobile terminal 113A via the Internet 104 and an Internet connection gateway 115A, and is then transferred to the mobile terminal 113A. Upon reception of the e-mail message, the mobile terminal user accesses the photo site server 105 via a route of mobile network 114A—Internet connection gateway 115A—Internet 104 by inputting the random URL address described in the e-mail message at a Web browser dedicated to the mobile terminal 113A.

The photo site 105 returns Web data created using a description language such as HTML, XML, or the like, which can be displayed on a Web browser that runs on the PC 102, in response to access from the browse user.

On the other hand, the photo site 105 returns Web data created using a description language such as Wireless Markup Language (WML), CompactHTML, or the like, which can be displayed on a Web browser that runs on the mobile terminal 113A, in response to access from the mobile terminal user. In this case, the photo site server 105 discriminates the model of the mobile terminal 113A that the mobile terminal user uses, and outputs Web data created using a description language compatible to that model. The model which can browse is not only the mobile terminal 113A but also a mobile terminal 113B which uses a different communication protocol specification, information description language, and mobile network environment. Hence, the photo site 105 generates and outputs Web data created using description languages compatible to various mobile terminals. For the sake of simplicity, FIG. 1 shows only two mobile terminal models A and B that can be used. However, in practice, three or more mobile terminal models can be used.

<Example of Arrangement of Photo Site of this Embodiment>

Figure 2:
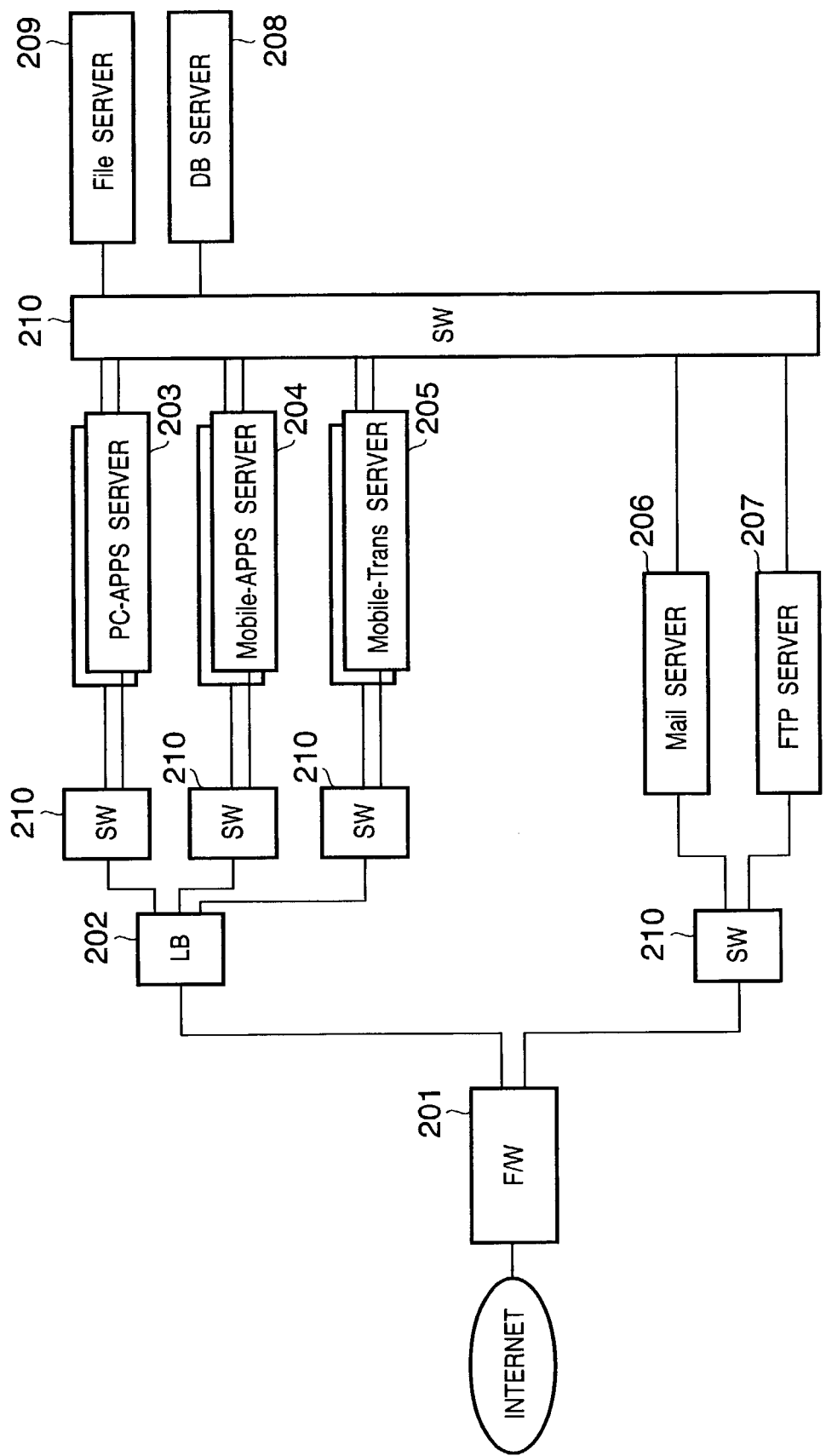
FIG. 2 is a block diagram showing an example of the arrangement of a photo site according to the embodiment of the present invention.

FIG. 2 shows an example of the arrangement of the photo site 105 of this embodiment.

The photo site 105 mainly comprises a firewall (F/W) 201, load balancer (LB) 202, application servers 203 and 204, contents conversion server 205, mail server 206, FTP server 207, database (DB) server 208, file server 209, and Ethernet switch (SW) 210.

In the photo site 105, the firewall 201 has a function of, e.g., blocking external invasions and attacks. The firewall 201 is used to securely manage the servers on the intranet in the photo site 105.

The photo site 105 includes the application server (PC-APPS) 203 which provides services mainly to the PCs 102, and the application server (Mobile-APPS) 204 which provides services to the mobile terminals 113. These application servers serve as WWW servers. The application servers 203 and 204 acquire image information and user information, and generate pages in collaboration with the DC server 208 as needed.

The load balancer 202 is a load distribution device, and has a load distribution function that distributes accesses to the photo site 105 to a plurality of servers in the intranet. Also, the load balancer 202 has a function of acquiring terminal information of an access source, and discriminating if a browse request comes from the mobile terminal 103 or PC 102. Based on this discrimination result, the load balancer 202 distributes a browse request from the PC 102 to the application server 203, and that from the mobile terminal 113 to the contents conversion server (Mobile-Trans) 205.

The application server 203 has a home page of a net image save service corresponding to access from the PC 102. Also, the application server 203 provides user home pages for respective users, and allows these users to use an image keep service including image browse, password setup, browse notification mail services, and the like.

The contents conversion server 205 serves as a proxy server which relays access from the mobile terminal 113 to the mobile terminal application server 204. Upon receiving a request from the mobile terminal 113, the contents conversion server 205 relays the received request to the mobile terminal application server 204.

The application server 204 communicates with backends (the DB server 208 and file server 209 that save information such as the IDs, image information, passwords required upon publishing browse images, and the like of respective users), dynamically generates mobile terminal display dialog data in accordance with a request, and returns that data to the contents conversion server 205. The application server 204 provides an image browse service corresponding to access from the mobile terminal 113, and generates pages for respective users.

The contents conversion server 205 makes contents conversion of the received mobile terminal display dialog data in correspondence with the mobile terminal 113 as a request source, and sends back the converted data to the mobile terminal 113. The contents conversion server 205 has tables corresponding to respective mobile terminals, and associates model information of mobile terminals with image information, markup languages, and the like to be converted. The contents conversion server 205 performs data conversion including image formation conversion for each mobile terminal 113 corresponding to another markup language in response to a request. More specifically, upon receiving a request from the mobile terminal 113 by HTTP, the contents conversion server 205 acquires model information as User-Agent information contained in the request, and makes data conversion with reference to information set in a table.

The mail server 206 sends a user registration confirmation mail message, image data browse notification mail message, and the like in accordance with instructions from the application server 203.

The FTP server 207 receives images uploaded by the user using an ftp protocol. Image data received once are saved in the file server 209 which serves as a main storage.

The aforementioned photo site 105 according to this embodiment has the following functions:

(1) User registration: This function allows the user to make user registration as a user who receives services of the photo site 105 using the user PC 102A. The photo site server 105 issues a user ID to the registered user.

(2) Image upload: This function allows transfer of images from the user PC 102A to the photo site 105.

(3) Print order: This function allows the user to issue an image print instruction from the user PC 102A to the photo site 105, and prints images via the print site 109.

(4) Notification of browse permission: This function sends an e-mail message that grants permission to browse image data stored at the photo site 105 to the user PC 102B and mobile terminal 113A, in response to instruction from the user PC 102A.

(5) Publication of image data: The user PC 102A allows the user PC 102B to browse image data stored at the photo site 105.

(6) Publication of image data to mobile terminal 113: The user PC 102A allows the mobile terminal 113A to browse image data stored at the photo site 105.

<Example of Hardware Arrangement of Photo Site of this Embodiment>

Figure 3:
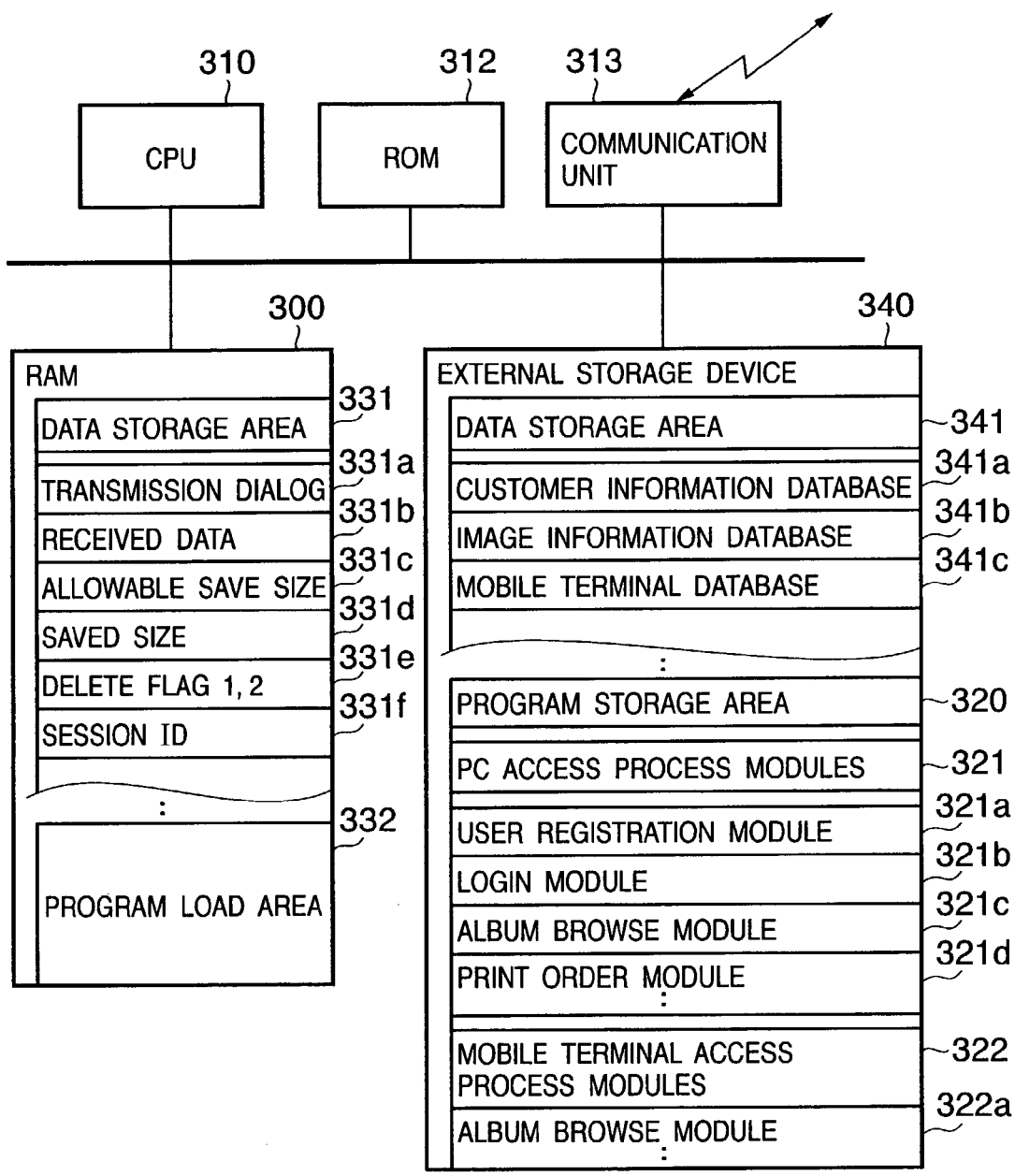
FIG. 3 is a block diagram showing an example of the hardware arrangement of the photo site according to the embodiment of the present invention.

FIG. 3 shows an example of the hardware arrangement of the photo site 105 of this embodiment. Note that FIG. 3 shows the arrangement with focus on a control unit, but input/output devices and the like are omitted.

Reference numeral 310 denotes a Central Processing Unit (CPU) as a control device of FIG. 1, which controls the entire photo site 105. A Read Only Memory (ROM) 312 stores programs and parameters which need not be changed. A Random Access Memory (RAM) 300 provides storage areas for temporarily storing programs and data, and includes a data storage area 331 and program load area 332.

System programs such as an OS, printer driver, and the like, or application programs provided by the user or the like are loaded onto the program load area 332. The loaded programs are executed by the CPU 310.

On the data storage area 331, a transmission dialog 331a to be provided to a user's communication terminal, received data 331b received from the user's communication terminal, an allowable save size 331c and currently saved size 331d, which are used to check if data can be saved, an area 331e that stores delete flags 1 and 2 used upon browsing from the mobile terminal 113, a session ID 331f, and the like are assured as areas used in this embodiment.

An external storage device 340 includes a fixed hard disk or memory card, or a detachable, mobile medium such as a floppy disk, an optical disk such as a CD or the like, magnetic and optical cards, an IC card, a memory card, or the like. The external storage device 340 includes a data storage area 341 and program storage area 342.

The data storage area 341 stores a customer information database 341a used to manage customer information user-registered in the photo site 105, an image information database 341b used to manage saved image information, a mobile terminal database 341c used to manage information for mobile terminals, and the like. Details of these databases are shown in FIGS. 4 to 9 and FIGS. 29 to 31.

The program storage area 320 stores programs which are to be loaded onto the program load area 332 of the RAM 300 upon execution (a program may be directly executed in, e.g., a memory card or the like). Although not shown in FIG. 3, the program storage area 320 also stores system programs such as an OS, Basic Input/Output System (BIOS), and the like used in this embodiment. In FIG. 3, a user registration module 321a, login module 321b, album browse module 321c, print order module 321d, and the like are stored as a program 321 for a PC access process. Furthermore, as a program 322 for a mobile terminal access process, an album browser module 322a as a characteristic feature of this embodiment is stored.

Note that the hardware arrangement that specifies the photo site 105 as a single apparatus has been exemplified. However, the servers shown in FIG. 2 may be present as independent apparatuses, and are connected via a LAN or the like to form the system arrangement. Also, the storage unit (especially, the external storage device 340) may be distributed to a plurality of devices.

<Example of Configuration of Database>

FIGS. 4 to 9 show the contents of the DB server 208 managed by the photo site 105 of this embodiment.

FIG. 4 shows a data table associated with customer information managed at the photo site 105 in this embodiment.

When the user executes user registration, a customer information data table 400 is generated for one record per user, and is registered in and managed by the DB server 208. A user ID is uniquely defined for each user, and customer information is managed by the customer information table 400 using a user ID 401 as a key. Information managed as customer information includes a destination mail address 402, login name 403, password 404, name (last name) 405, name (first name) 406, furigana name (last name) 407, furigana name (first name) 408, postal codes (1, 2) 409 and 410, prefecture code 411, addresses (1, 2) 412 and 413, phone numbers (1, 2, 3) 414, 415, and 416, and user registration state 417. The user registration state 417 indicates a user who has been registered and can receive services if it is "1", or a user whose registration has been deleted and cannot receive any services if it is "0".

FIG. 5 shows a customer state table used to manage information that represents the current state of the user who has been registered in the photo site 105 in this embodiment.

When the user executes user registration, a customer state data table 500 is generated for one record per user, and is registered in and managed by the DB server 208. Setting values in this record are updated as needed in accordance with user's operations during access to the photo site. For this reason, when the user logs on the system, the customer state data table 500 stores the last used state of the user. This customer state data table 500 stores an album ID 502 of an album that the user displayed most recently, a disk use upper limit size 503, and points 504 accumulated upon placing print orders, using a user ID 501 as a key. Note that user ID 501 stores the same value as the user ID 401 in case of an identical user.

FIG. 6 shows a customer album data table managed by the photo site 105 in this embodiment.

When the user creates a new album, a customer album data table 600 is generated for one record accordingly, and is registered in and managed by the DB server 208. This record is deleted from the DB server 208 if the corresponding album is deleted by user's operation. The customer album data table 600 stores an ID 602 of an album of the user, and a display order number 603 of that album using a user ID 601 of the registered user as a key. Note that user ID 601 stores the same value as the user ID 401 in case of an identical user.

FIG. 7 shows an album information data table managed by the photo site 105 in this embodiment. When the user creates a new album at the photo site 105, an album information data table 700 is generated for one record accordingly, and is registered in and managed by the DB server 208. This record is deleted from the DB server 208 when the user deletes the corresponding album. The album information data table 700 manages an album name 702, a file path 703 to a comment to an album, an album publication allowability flag 704, a password certification flag 705, an album password 706, a print allowability flag 707, an original image display allowability flag 708, a display mode number 709, a browse inhibition flag 710, a browse count 711, and a mobile browse count 712 using an album ID 701 as a key.

If the album publication allowability flag 704 is "1", it indicates that publication is permitted; if it is "0", it indicates that publication is inhibited; and if it is "−1", it indicates that publication is inhibited by a site manager. If the password certification flag 705 is "1", it indicates that a password is set; if it is "0", it indicates that a password is not set. If the password certification flag 705 is "1", a password is saved in the album password 706. If the print allowability flag 707 is "1", it indicates that the album can be printed; if it is "0", it indicates that the album cannot be printed. If the original image display allowability flag 708 is "1", it indicates that display is permitted; if it is "0", it indicates that display is inhibited. If the display mode number is "1", it indicates a list display mode; if it is "0", it indicates a detailed display mode. Note that the album IDs 701 and 602 store the same ID in an identical album. If the album browse inhibition flag 710 is "1", it indicates that the mobile terminal can browse; if it is "0", it indicates that the mobile terminal cannot browse. This flag is controlled by a service manager. Also, the album browse count 711 from the PC 102 and the album browse count 712 from the mobile terminal are saved.

FIG. 8 shows an album image data table 800 managed by the photo site 105 in this embodiment.

When the user uploads an image onto an album, an album image data table 800 is generated for one record per image, and is registered in and managed by the DB server 208. This record is deleted from the DB server 208 when a corresponding image is deleted. The album image data table 800 manages an image ID 802 of an image stored in an album with an album ID 801, and an image display number 803 indicating the display position of that image in the album. Note that the album IDs 801 and 701 store the same ID in an identical album.

FIG. 9 shows an image information table 900 managed by the photo site 105 in this embodiment.

When the user uploads an image onto an album, an image information data table 900 is generated for one record per image, and is registered in and managed by the DB server 208. This record is deleted from the DB server 208 when a corresponding image is deleted. The image information table 900 saves a user ID 902 of the user who possesses that image, an image name 903, a file path 904 to an original image, a path 905 to a thumbnail file, a file path 906 to a preview image, a path 907 to a comment file to an image, an image browse count 908, an image print count 909, a mobile browse count 910, and a browse inhibition flag 911, using an image ID 901 as a key. Note that the image IDs 901 and 802 store the same ID for an identical image, and the user IDs 902 and 401 store the same ID for an identical user. The image browse count 910 from the mobile terminal is saved. If the browse inhibition flag 911 is "1", it indicates that the image can be browsed; if it is "0", it indicates that the image cannot be browsed.

<Operation Example of Photo Site of this Embodiment>

Figure 10:
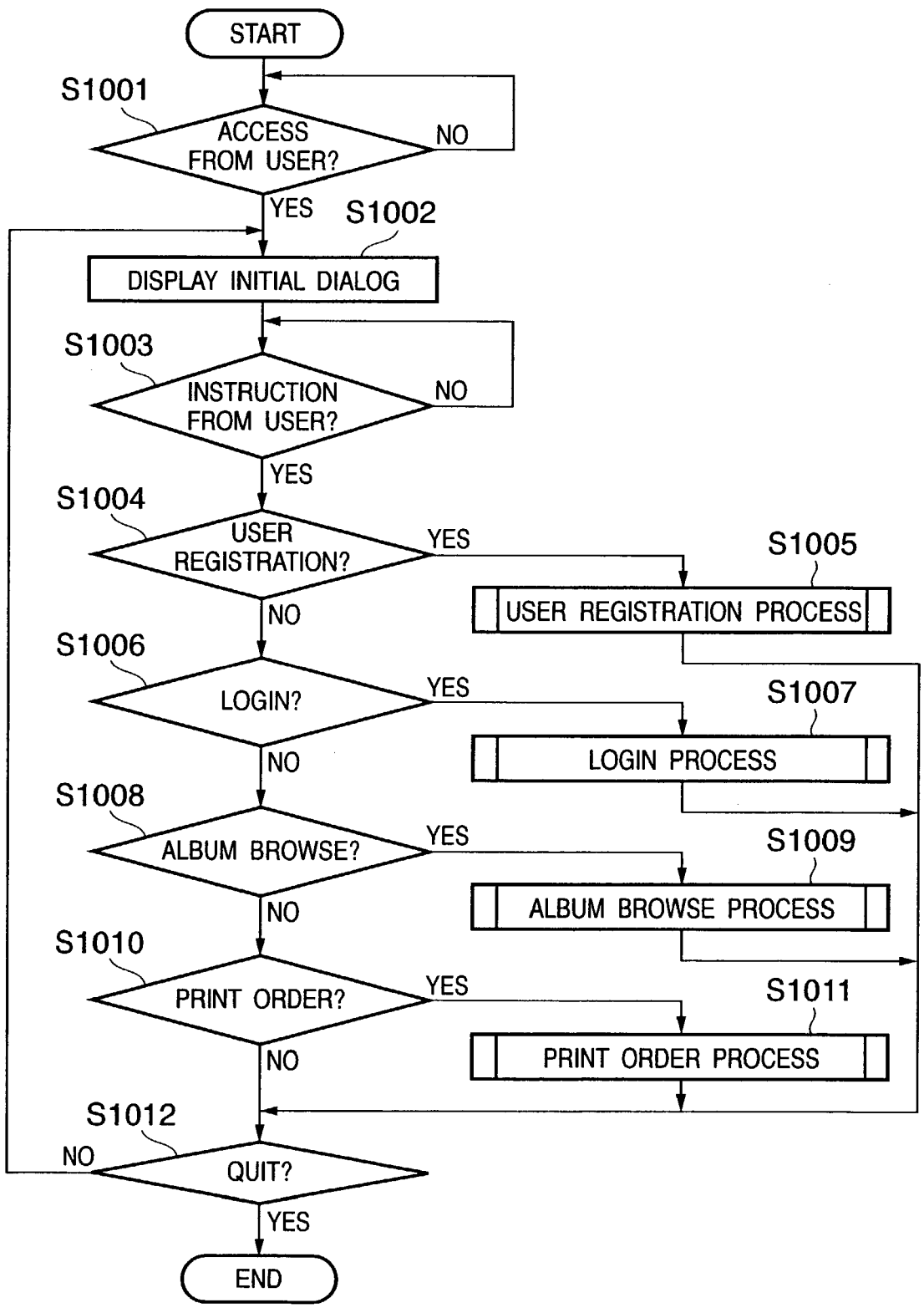
FIG. 10 is a flow chart showing the processing sequence at the photo site in response to access from a PC according to the embodiment of the present invention.

FIG. 10 shows an operation example of the overall photo site 105, and especially, an operation example in response to access from the PC.

Upon detection of an access request from the PC 102 by user's operation in step S1001, an initial dialog (see FIG. 11) is displayed. If the user inputs an instruction in response to the initial dialog, it is checked in turn in steps S1004, S1006, S1008, and S1010 if "user registration", "login", "album browse", or "print order" has been selected. If "user registration" has been selected, a user registration process is executed in step S1005. If "login" has been selected, a login process is executed in step S1007. If "album browse" has been selected, an album browse process is executed in step S1009. If "print order" has been selected, a print order process is executed in step S1011.

Upon completion of respective processes, or if none of processes are selected, it is checked in step S1012 if the user quits site access. If NO in step S1012, the flow returns to step S1002 to display the initial dialog again. Upon reception of a quit instruction from the PC 102 by user's operation, the photo site 105 ends this process.

Detailed services of the application server 203 to the PC 102 will be explained below. In the following description, a case will be exemplified wherein the user PC 102A uploads images (saves images), and the user PC 102B or the mobile terminal 113A or 113B browses images.

(Entrance to Photo Site 105).

Figure 11:
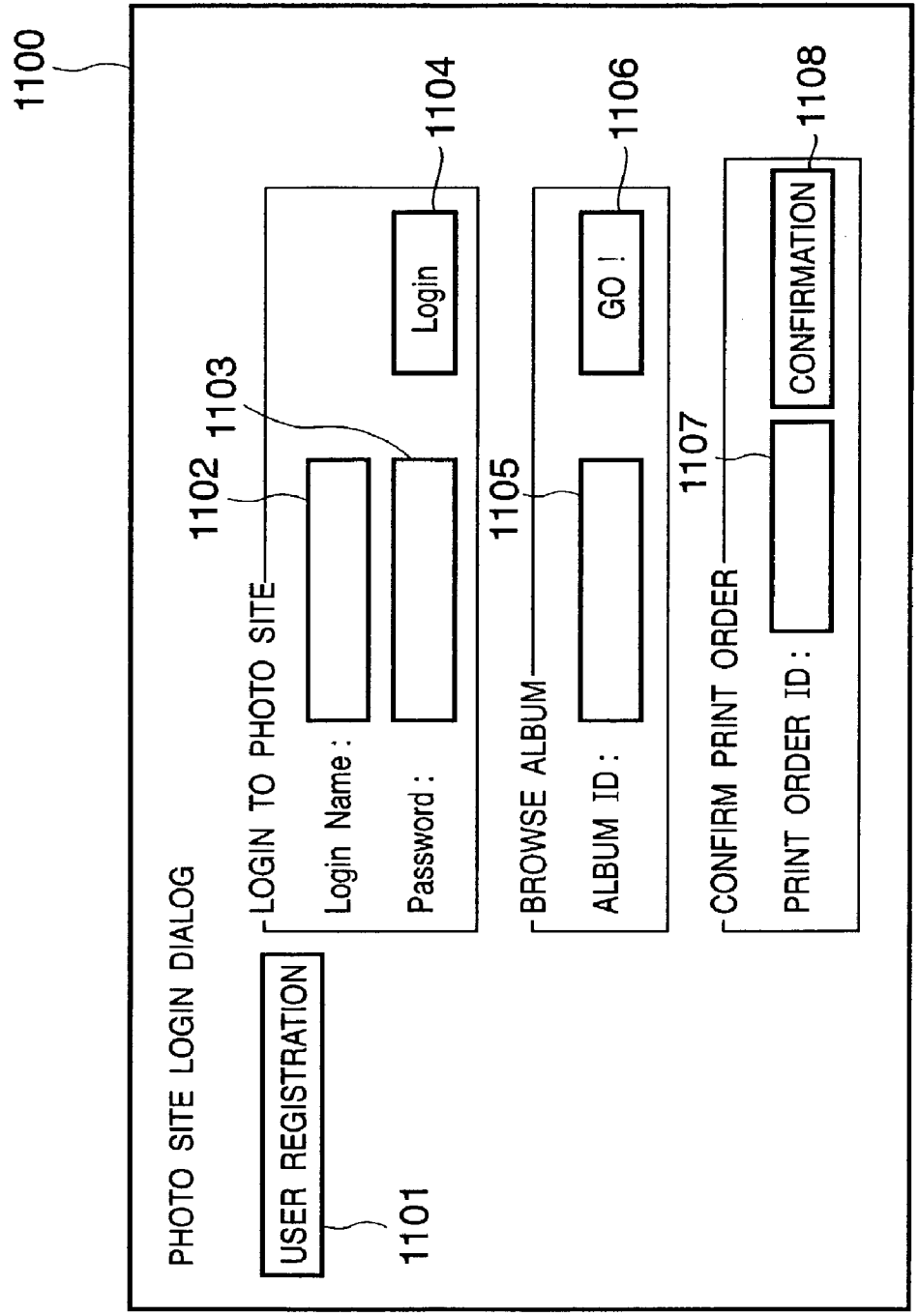
FIG. 11 shows an example of an initial dialog that the photo site according to the embodiment of the present invention provides to a user terminal.

FIG. 11 shows an example of an initial dialog displayed first when the user wants to receive services of the photo site 105 in this embodiment.

The storage unit of the photo site 105 stores HTML data used to display this dialog 1100, and that data is free to download via the Internet 104. Hence, when the user launches the Web browser and designates a URL indicating the address of the Web server of the photo site 105 on the user PC 102A, the dialog 1100 shown in FIG. 11 is displayed.

The dialog 1100 has a user registration button 1101, input fields 1102 and 1103 of a login name and password required when the registered user accesses the photo site 105, a login button 1104, an album ID input field 1105 required to browse an album, an album browse button 1106, and a print order ID input field 1107 and print order confirmation button 1108 used upon confirming print order status.

Processes executed upon depression of respective buttons on the dialog 1100 will be explained below.

(Login)

A procedure required for the user who has registered in the photo site 105 to receive services at the photo site 105 will be explained below. In this embodiment, all user's images are managed by folders named albums.

When the user inputs his or her login name and password to the login name input field 1102 and password input field 1103, and presses the login button 1104 on the dialog 1100 in FIG. 11, the photo site 105 searches the DB server 208 for a corresponding record of the customer information data table 400. If the input login name cannot be found from the customer information data table 400, or if a password stored in the found record does not match a character string input to the password input field, an alert dialog is displayed.

If the password stored in the found record matches the character string input to the input field 1103, it is determined that user authentication has succeeded, and a dialog 1200 shown in FIG. 12 (this dialog will be also referred to as a main menu hereinafter) is displayed.

Figure 12:
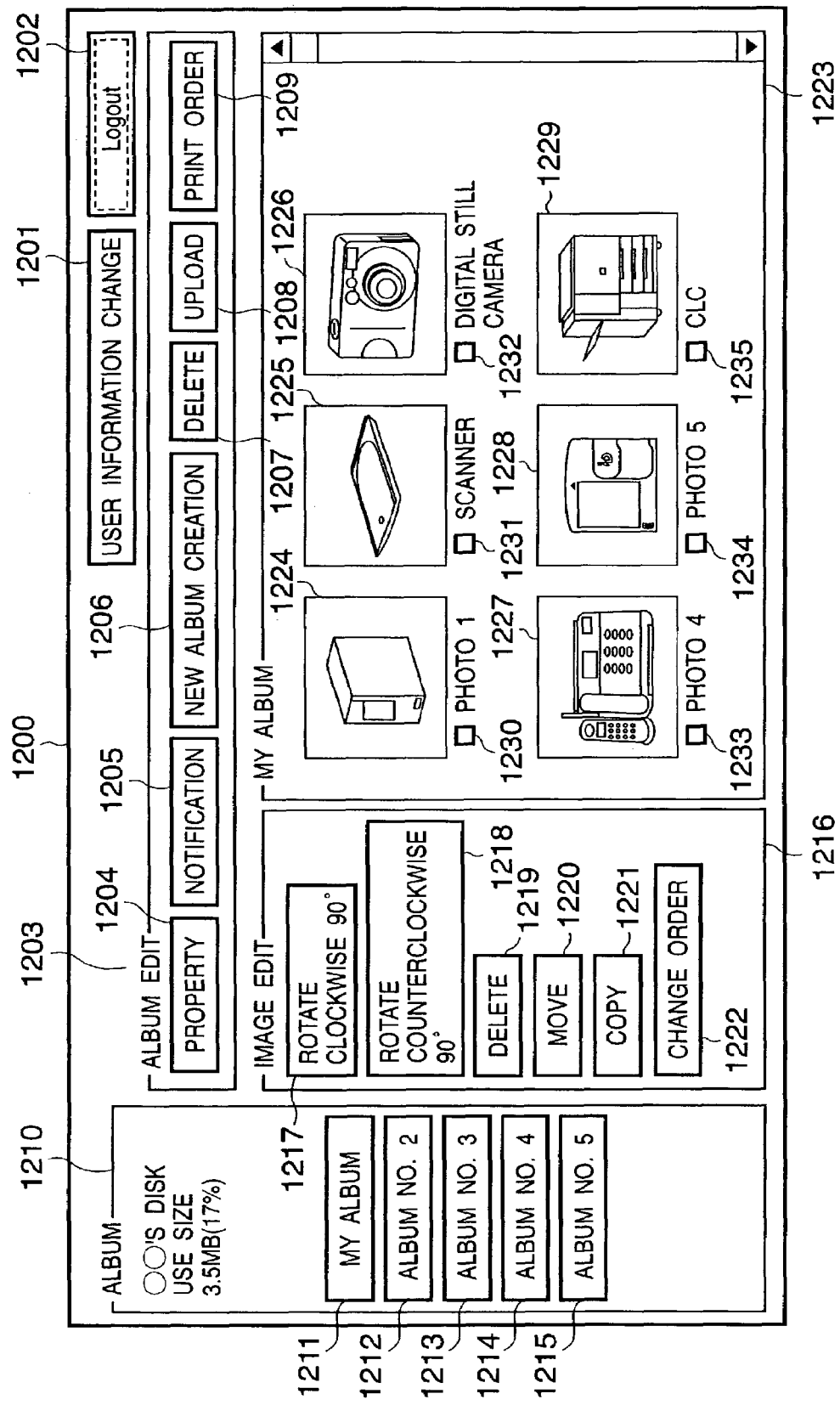
FIG. 12 shows an example of a main menu dialog that the photo site according to the embodiment of the present invention provides to the user terminal.

On the dialog 1200 in FIG. 12, a button 1201 is used to change user information. A button 1202 is a logout button. On a field 1203, buttons used to edit an album displayed on this dialog are laid out. A button 1204 is used to set the property of an album. A button 1205 is an album notification button. A button 1206 is used to create a new album. A button 1207 is used to delete an album. A button 1208 is used to upload an image. A button 1209 is a print order button. On a field 1210, buttons used to select an album are displayed. At the head of this field, the total size of images that the user saves on the photo site 105, and the ratio of that total size to the allowable use size are displayed. Below such information, buttons corresponding in number to albums created by the user are laid out.

In FIG. 12, it is confirmed by buttons 1211 to 1215 that the user created five albums. Upon depression of each of these buttons, the photo site 105 updates images displayed on an album display field 1223 in accordance with the selected album, and displays the album name of that album at the upper left corner position of the album display field. On a field 1216, buttons used to edit images in the album are laid out. Upon depression of each of buttons 1217 to 1222, an edit process corresponding to the pressed button is done for images which are displayed within the field 1223 and have checked check boxes. The field 1223 is an album image display field. On this field, images stored in the album are displayed in turn, and check boxes are laid out in correspondence with the images. When the user presses each image, a property setup dialog of that image is displayed.

Figure 13:
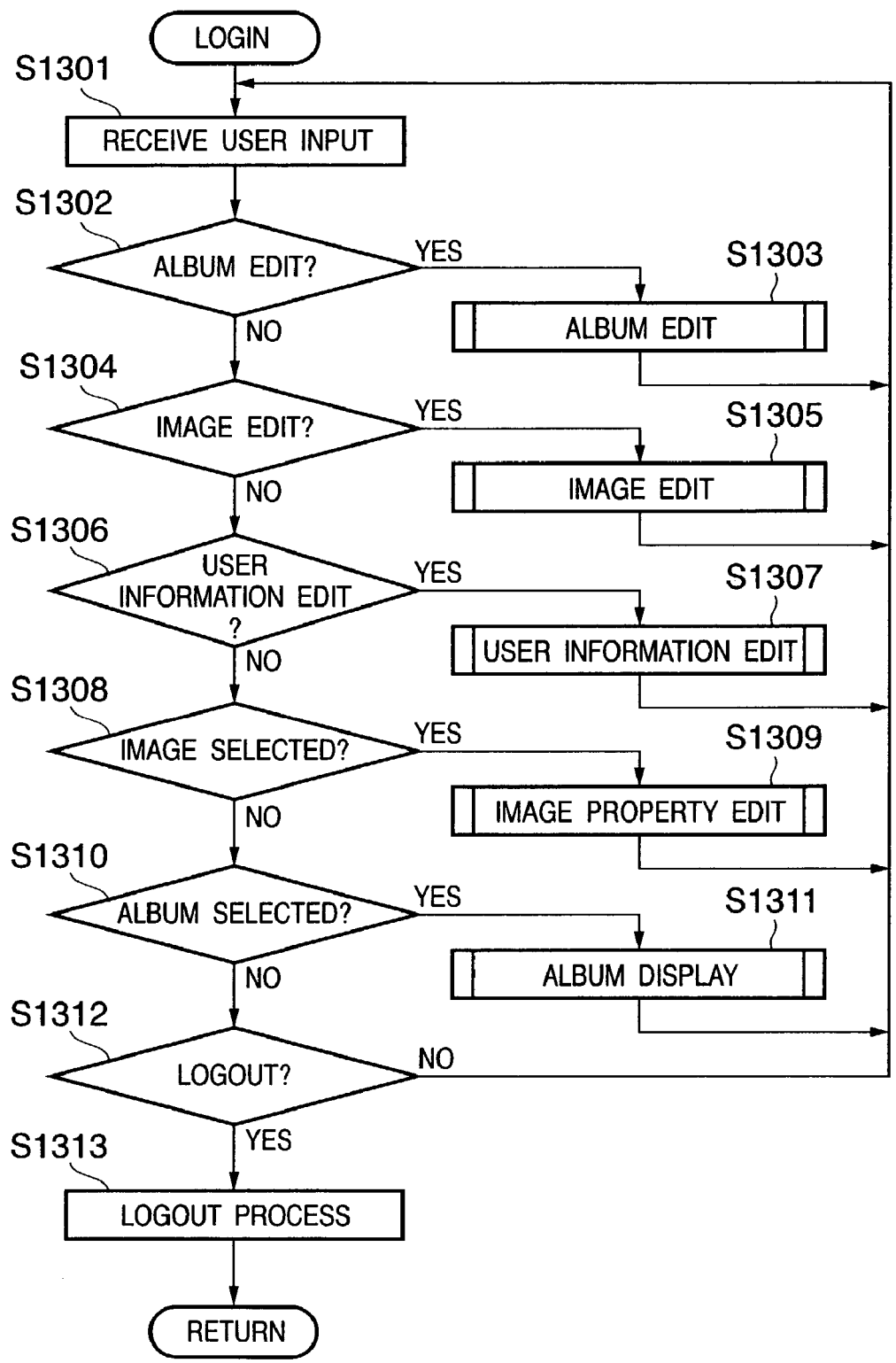
FIG. 13 is a flow chart showing the process at the photo site in response to operations at the user terminal according to the embodiment of the present invention.

FIG. 13 is a flow chart showing a processing method associated with user's edit operation after the dialog 1200 in FIG. 12 is displayed. The following processes are done in accordance with user's operations on the dialog 1200.

In step S1301, a user input is accepted. It is checked in step S1302 if the user input is album edit. When the user has pressed one of the buttons in the field 1203, album edit is determined, and in such case, the flow advances to step S1303 to execute an album edit process.

If it is determined in step S1302 that the user input is not album edit, it is checked in step S1304 if the user input is image edit. When the user has pressed one of the buttons in the field 1216 on the dialog 1200, image edit is determined, and the flow advances to step S1305. Instep S1305, a process such as clockwise/counterclockwise 90° rotation, delete, move, copy, order change, or the like is executed for the image selected from the album.

If it is determined in step S1304 that the user input is not image edit, the flow advances to step S1306 to check if the user input is edit of user information. When the user has pressed the button 1201 on the dialog 1200, edit of user information is determined. Upon depression of this button, a dedicated dialog is displayed, and the user can change the registered information.

If it is determined in step S1306 that the user input is not edit of user information, the flow advances to step S1308 to see if the user input is image selection. When the user has selected an arbitrary image by, e.g., clicking a mouse button on that image within the field 1223 on the dialog 1200, it is determined that image selection has been made, and the flow advances to step S1309 to execute an image property edit process. In the image property edit process, the user can edit the image file name and comment.

If it is determined in step S1308 that the user input is not image selection, the flow advances to step S1310 to check if the user input is album selection. When the user has pressed one of buttons within the field 1210 on the dialog 1200, it is determined that album selection has been made, and an album display process is executed in step S1311.

If it is determined in step S1310 that the user input is not album selection, it is checked in step S1312 if the user input is logout. When the user has pressed the button 1202 on the dialog 1200, it is determined that the user input is logout, and the flow advances to step S1313 to execute a logout process. Upon execution of the logout process, the photo site 105 updates the last display album ID 502 in the user state data table 500 in the DB server 208 by registering the album ID of the currently displayed album. After that, the dialog 1100 is displayed again.

If it is determined in step S1312 that the user input is not logout, the flow returns to step S1301 to wait for the next user input.

Details of steps S1303 (album edit) and S1311 (album display) will be described below.

[Album Edit Process]

Figure 14:
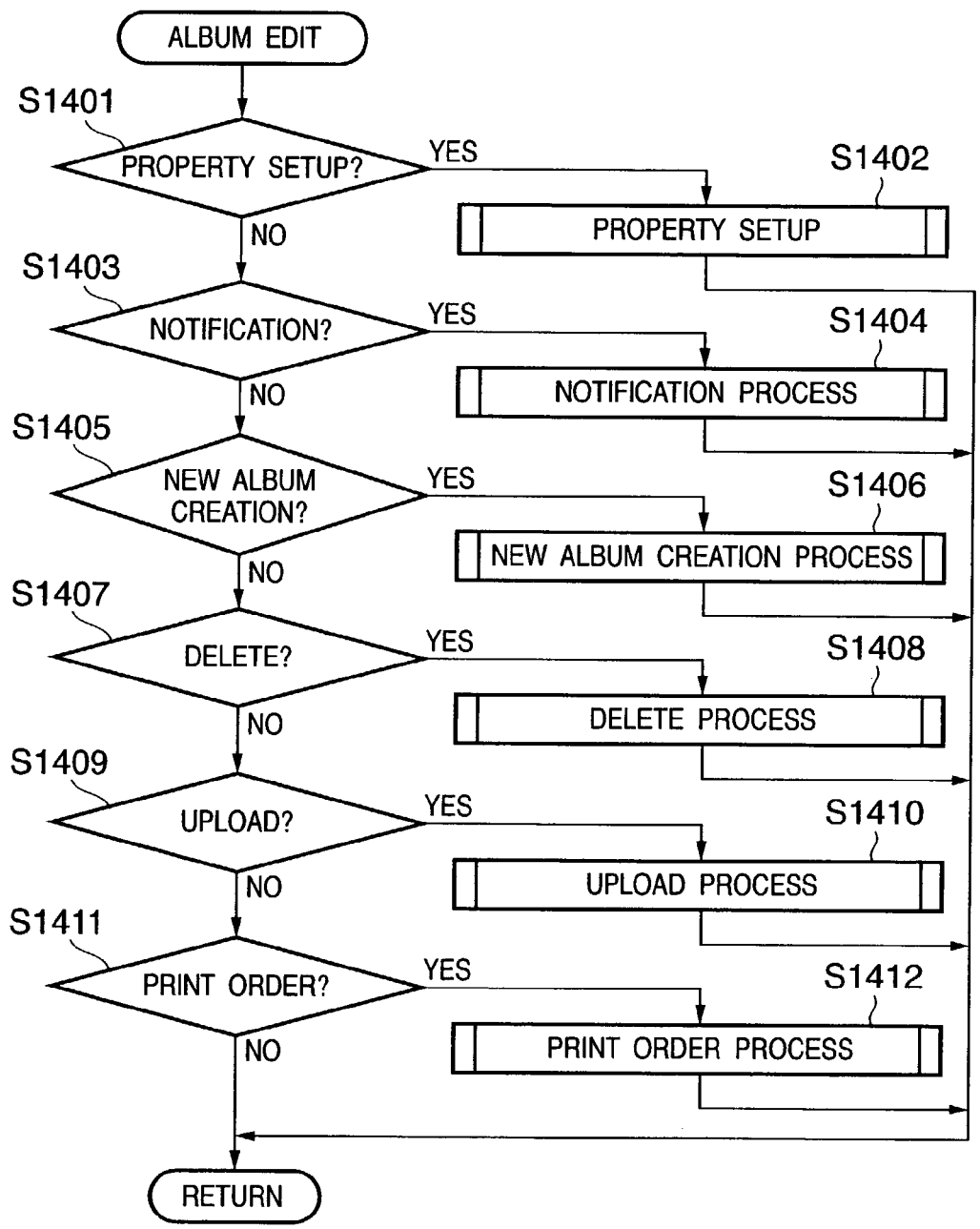
FIG. 14 is a flow chart showing an example of the sequence of an album edit process at the photo site according to the embodiment of the present invention.

FIG. 14 is a flow chart showing the sequence of the album edit process at the photo site 105.

Figure 15:
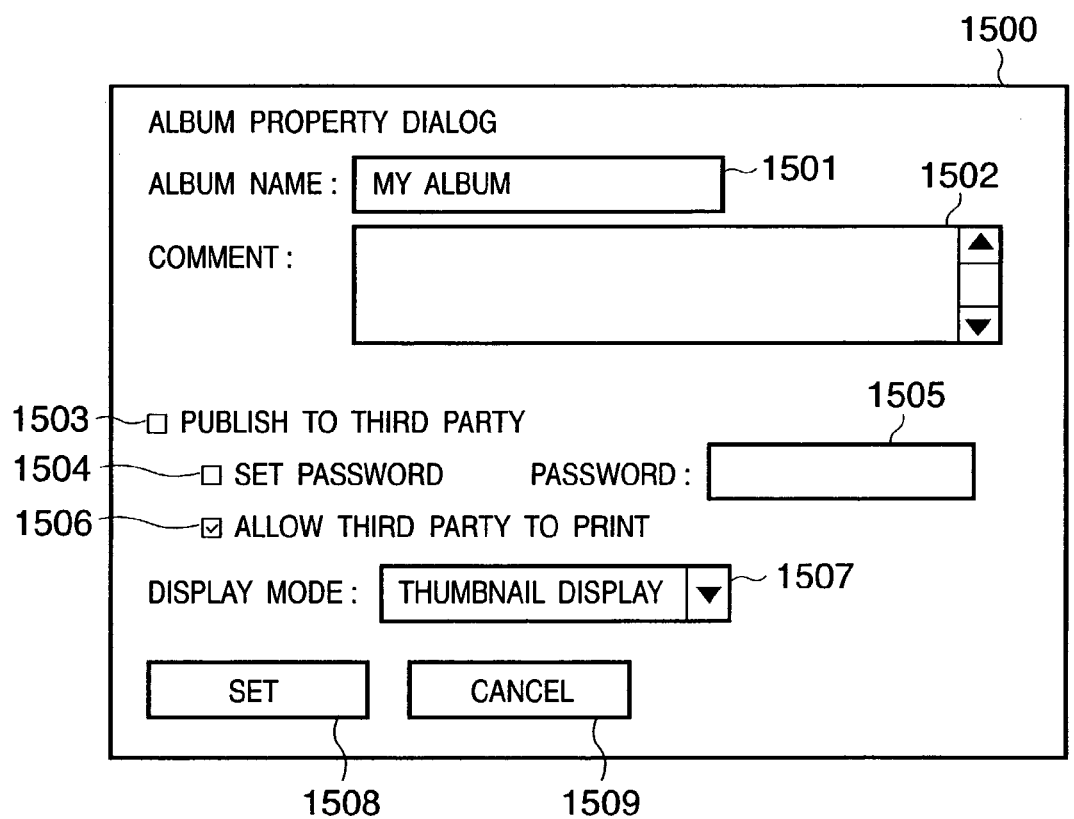
FIG. 15 shows an example of an album property setup dialog that the photo site according to the embodiment of the present invention provides to the user.

It is determined in step S1401 whether or not a property setup has been selected. When the user has pressed the button 1204 on the main menu dialog 1200, it is determined that the property setup has been selected, and the flow advances to step S1402. In this case, a dialog 1500 shown in FIG. 15 is displayed, and various properties associated with the selected album (the album displayed so far on the field 1223 in FIG. 12) can be set.

Figure 16:
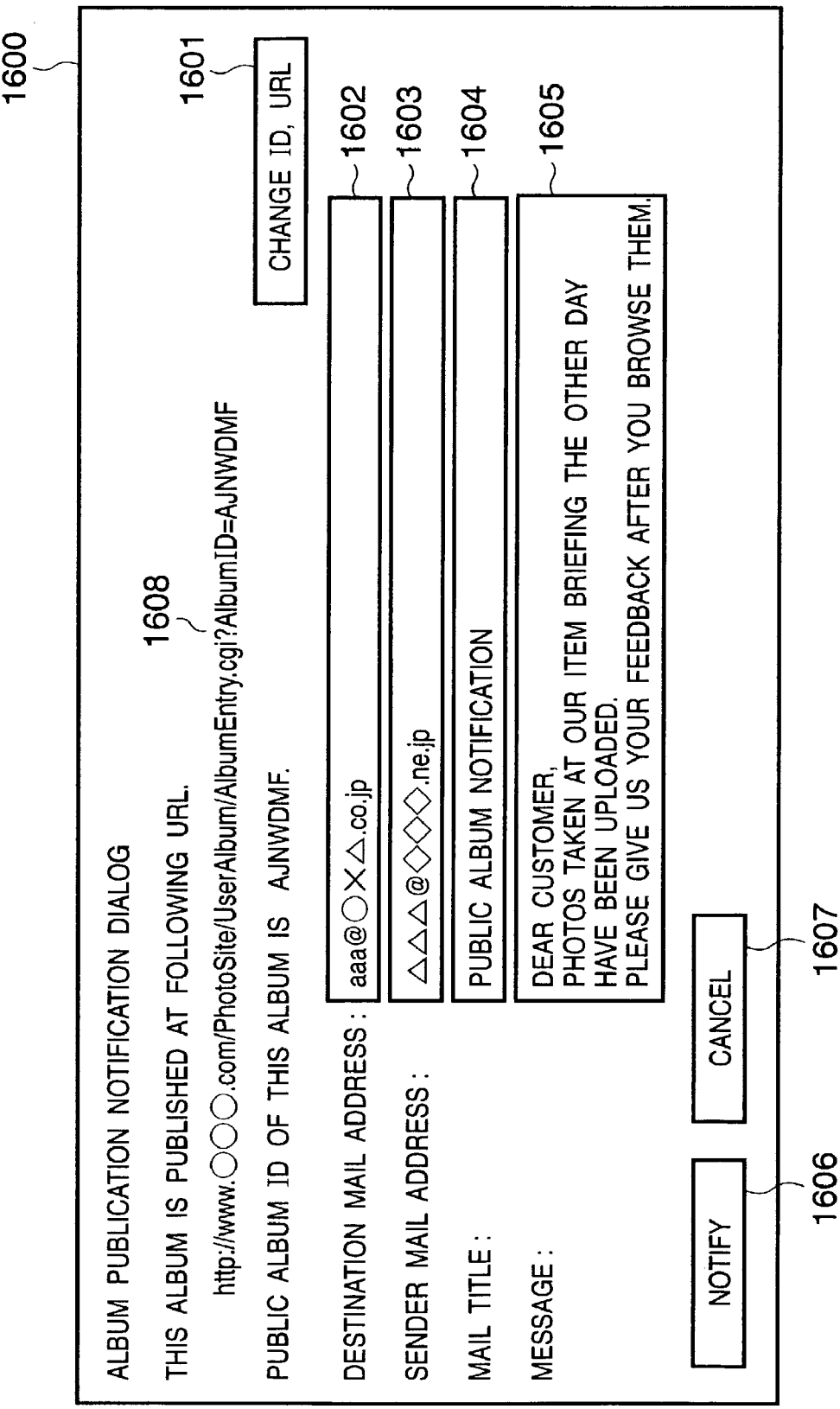
FIG. 16 shows an example of an e-mail notification setup dialog of an album that the photo site according to the embodiment of the present invention provides.

If it is determined in step S1401 that the property setup has not been selected, it is checked in step S1403 if album notification has been selected. When the user has pressed the button 1205 on the main menu dialog 1200, it is determined that the album notification has been selected, and the flow advances to step S1404. In this case, a dialog 1600 shown in FIG. 16 is displayed, and a setup required to notify a third party of a browsing method of the selected album via e-mail can be made.

If it is determined in step S1403 that album notification has not been selected, it is checked in step S1405 if new album creation has been selected. When the user has pressed the button 1206 on the main menu dialog 1200, it is determined that new album creation has been selected, and the flow advances to step S1406. In this case, the dialog 1500 shown in FIG. 15 is displayed. When the user inputs a new album name (an album name which has not been registered by that login user) to an album name input field 1501 on the dialog 1500 and presses a set button 1508, a new album is created.

Figure 17:
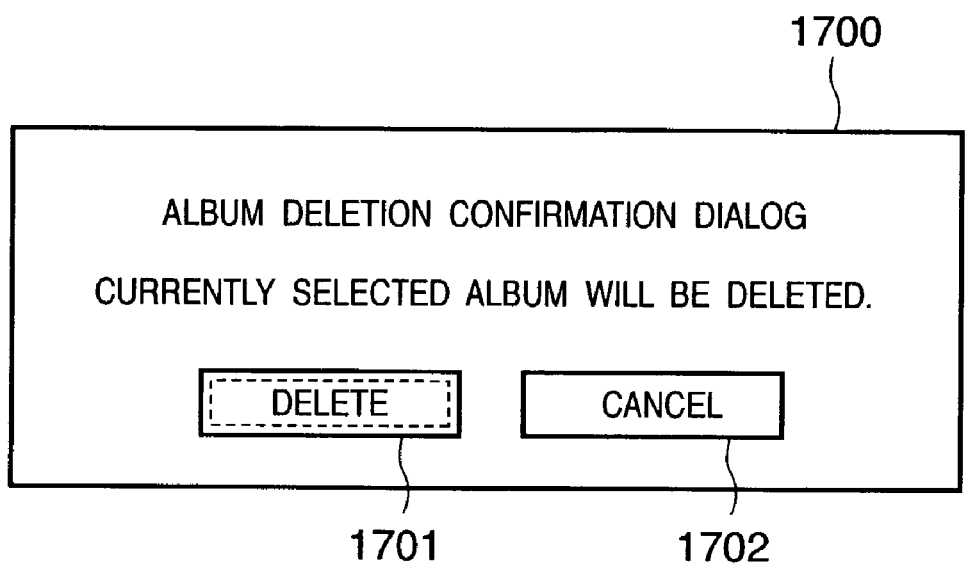
FIG. 17 shows an example of an album deletion confirmation dialog that the photo site according to the embodiment of the present invention provides.

If it is determined in step S1405 that new album creation has not been selected, it is determined in step S1407 whether or not album deletion has been selected. When the user has pressed the button 1207 on the main menu dialog 1200, it is determined that album deletion has been selected, and the flow advances to step S1408. Upon depression of the button 1207, a dialog 1700 shown in FIG. 17 is displayed, and the user can delete the selected album.

If it is determined in step S1407 that album deletion has not been selected, it is checked in step S1409 if image upload to the selected album has been selected. When the user has pressed the button 1208 on the main menu dialog 1200, it is determined that image upload has been selected, and the flow advances to step S1410 to execute an upload process.

If it is determined in step S1409 that image upload has not been selected, it is checked in step S1411 if album print order has been selected. When the user has pressed the button 1209 on the main menu dialog 1200, it is determined that album print order has been selected, and the flow advances to step S1412 to execute a print order process.

Figure 18:
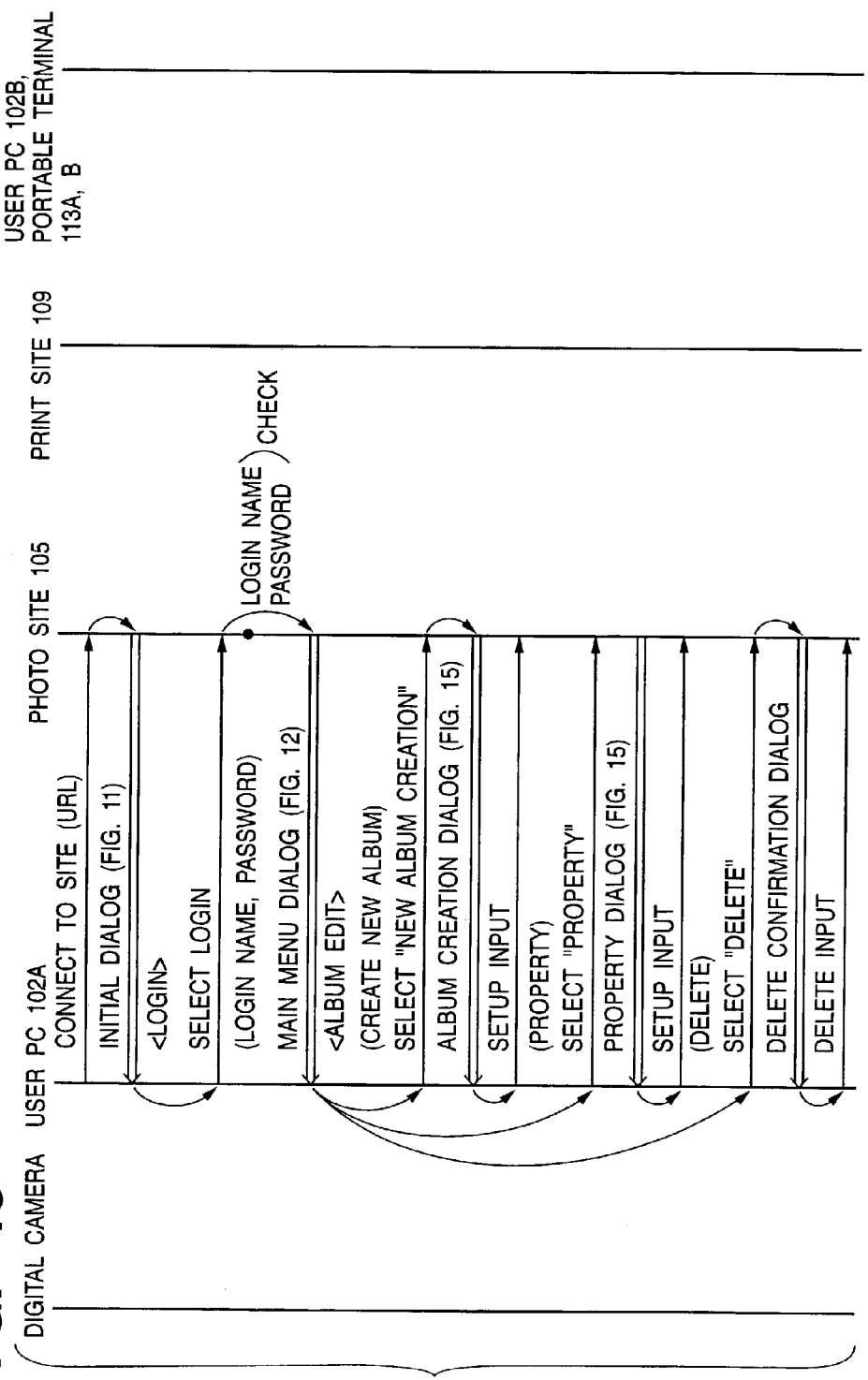
FIG. 18 shows an example of a protocol when a user PC according to the embodiment of the present invention issues a new album registration instruction, property instruction, and delete instruction to the photo site.

Note that FIG. 18 shows an example of a protocol between the user PC 102A and photo site 105 in the new album creation process, property setup process, and delete process in accordance with the sequence shown in FIG. 14.

Figure 19:
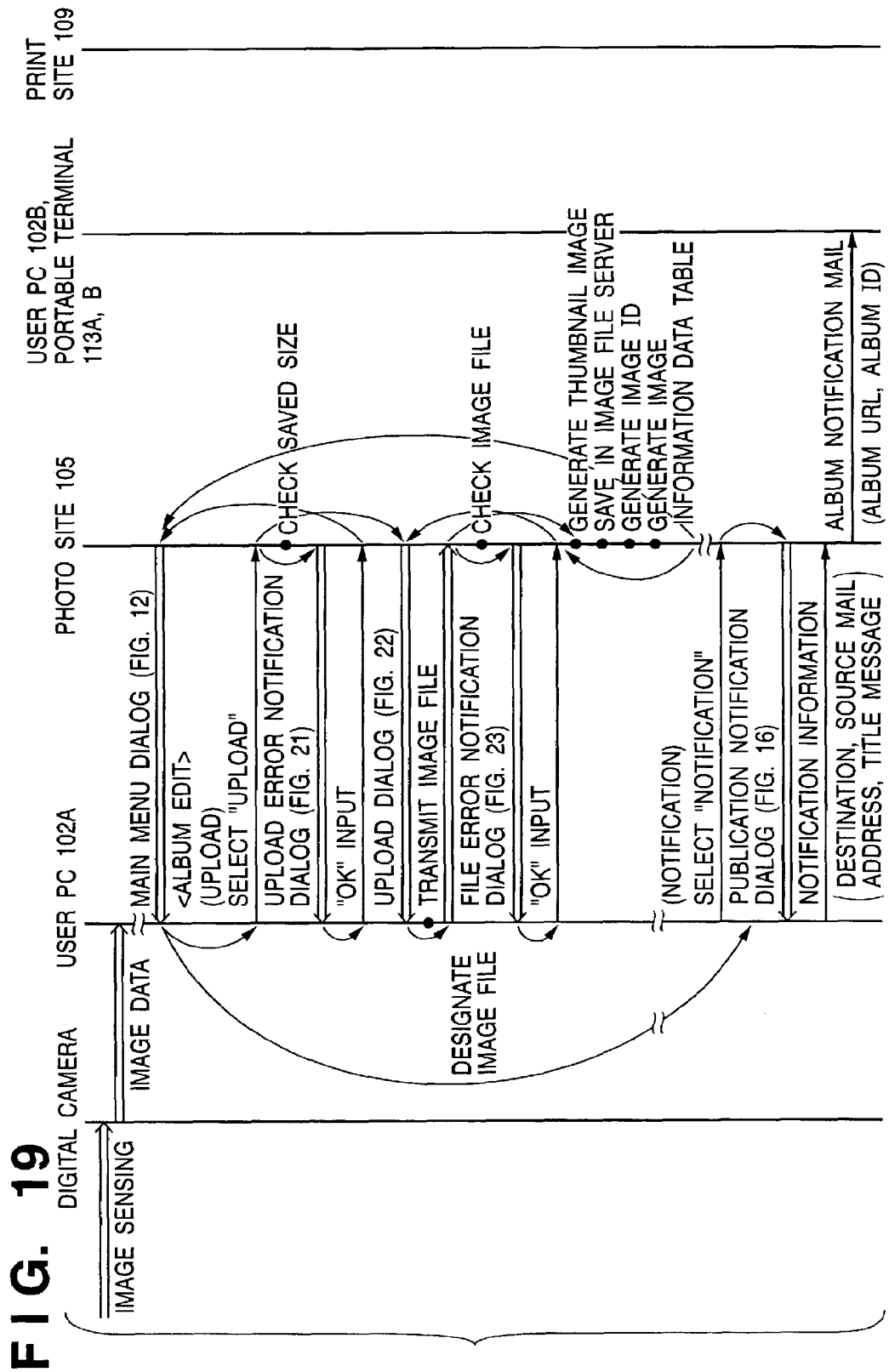
FIG. 19 shows an example of a protocol when a user PC according to the embodiment of the present invention uploads data and issues a data browse instruction to the photo site.

Of the above processes, the upload and browse notification processes will be described in detail later. FIG. 19 shows an example of a protocol between the user PC 102 and photo site 105 in the upload and browse notification processes.

(Image Upload Example)

Figure 20:
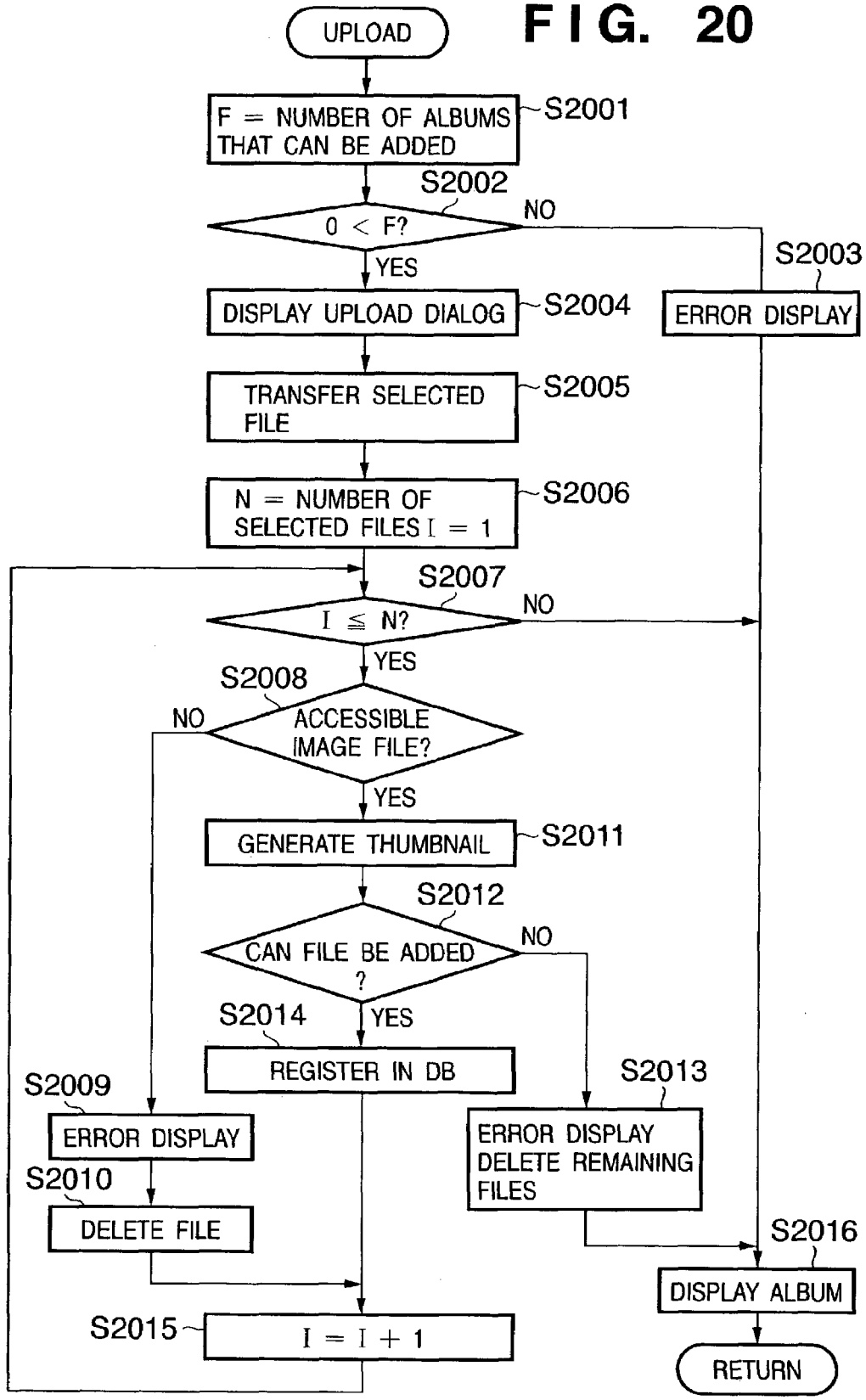
FIG. 20 is a flow chart showing the sequence for uploading an image to an album at the photo site according to the embodiment of the present invention.

The upload process of an image to the selected album will be explained below. Upon depression of the upload button 1208 on the main menu dialog 1200, the image upload process starts. FIG. 20 is a flow chart showing the flow of the process for uploading an image to the selected album.

If the user has pressed the button 1208 on the main menu dialog 1200, the photo site 105 calculates the number of files (Files) that the login user can add in the photo site 105 in step S2001. Since the photo site 105 has limited resources, the image storage size of each login user is predetermined. If that size is exceeded, the image cannot upload an image file.

Figure 21:
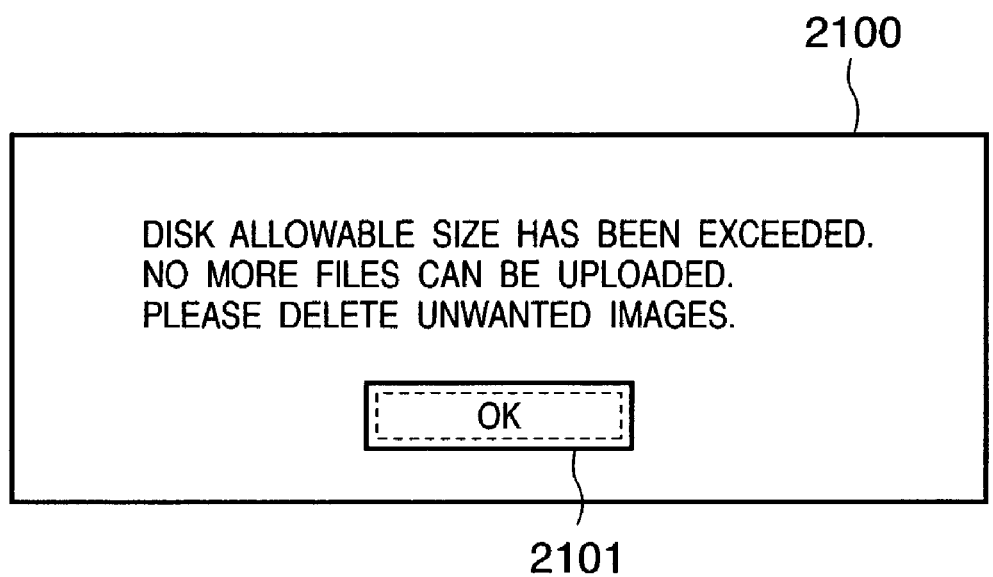
FIG. 21 shows an example of an alert dialog that the photo site according to the embodiment of the present invention provides to the user terminal.

That is, whether or not Files=a positive value is checked in step S2002 to see if an image file can be uploaded. If Files <"1", it is determined that an image file can be uploaded, and a dialog 2100 shown in FIG. 21 is displayed (step S2003). Upon depression of an OK button 2101 on the dialog 2100, the main menu dialog 1200 is displayed again.

Figure 22:
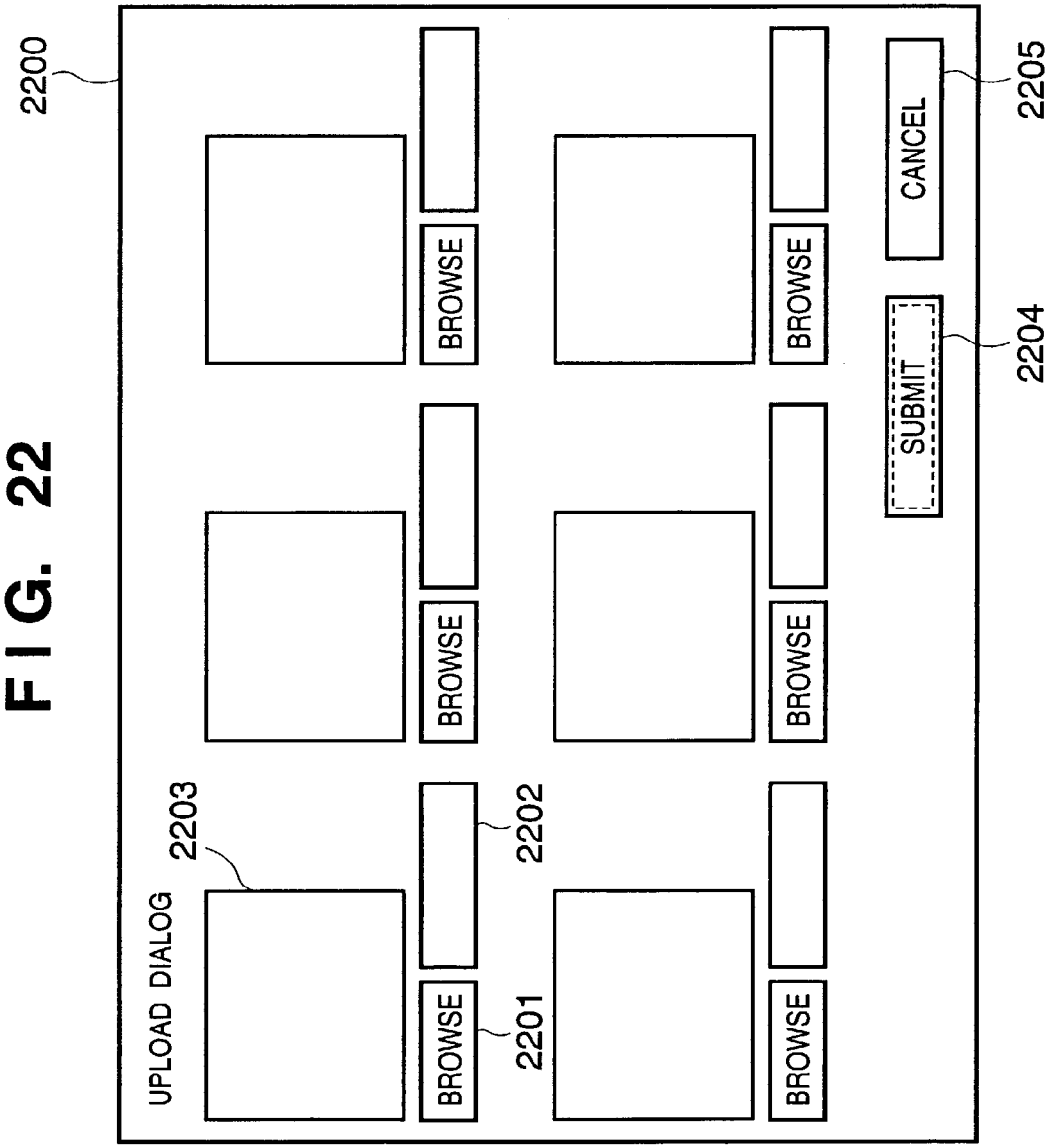
FIG. 22 shows an example of an image select dialog that the photo site according to the embodiment of the present invention provides to the user terminal.

If Files ≧1, an upload dialog 2200 shown in FIG. 22 is displayed in step S2004. This dialog displays browse buttons 2201 each of which is used to select a file on the user PC 102, input fields 2202 each of which is used to input a file path, preview fields 2203 each of which is used to display a thumbnail of the selected image, in correspondence with the number of files (Files) calculated in step S2001. Upon depression of a submit button 2204, the flow advances to step S2005, selected image files are transferred from the user PC 102 to a work area in the photo site 105. Although not shown in the flow chart of FIG. 20, if the user presses a cancel button 2205, the upload process ends, and the main menu dialog 1200 is displayed.

The image files transferred to the photo site 105 are saved in the file server 200. Note that N represents the number of transferred files. Also, "1" is set in work variable I (step S2006). It is checked in step S2007 if I≦N. If I>N, the main menu dialog 1200 is displayed in step S2016, thus ending the process.

Figure 23:
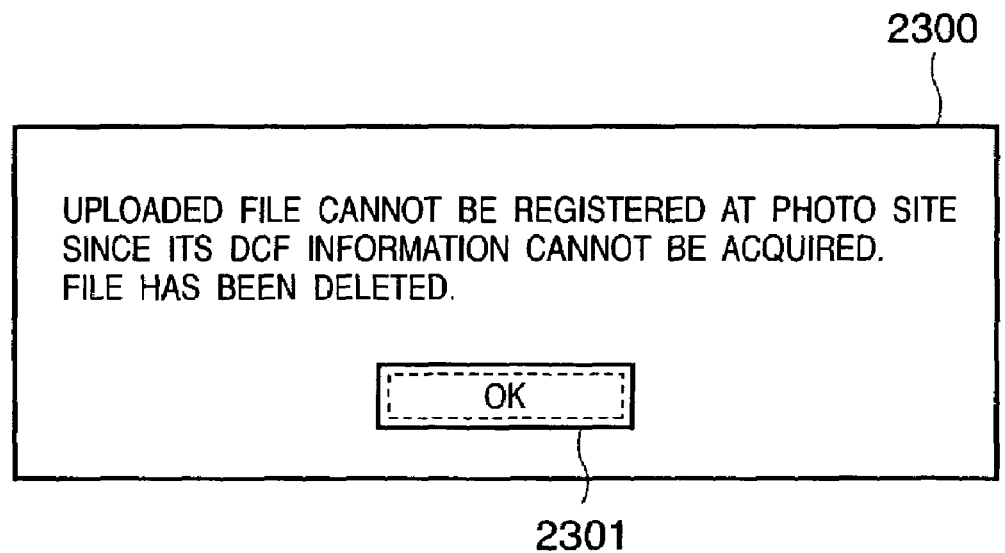
FIG. 23 shows an example of an alert dialog that the photo site according to the embodiment of the present invention provides to the user terminal.

If I≦N in step S2007, it is checked in step S2008 if the transferred I-th file is an image file that the photo site server 105 can handle. In this embodiment, only when an uploaded image is a JPEG file and digital still camera image sensing information in a DCF format can be extracted from its header field, it is determined that the photo site server 105 can use that file; otherwise, a dialog 2300 shown in FIG. 23 is displayed in step S2009 to delete the file of interest placed on the work area in the photo site 105 in step S2010. Note that DCF information is used to make color correction and the like for a print process using the shutter speed, use/non-use of an electronic flash, and the like upon printing an image at the print site 109A. Upon depression of an OK button 2301, the flow advances to step S2015 to start a process for uploading the next file.

If it is determined in step S2008 that the uploaded file is an image file in the predetermined format, the flow advances to step S2011 to generate a thumbnail image of that image, and the thumbnail image is transferred from the work area in the photo site 105 to the image file server 209.

It is determined in step S2012 whether or not a file can be added. That is, whether or not the disk use upper limit exceeds in the event that the currently processed file is added is determined in this process. If it is determined in step S2012 that a file cannot be added, the dialog 2100 shown in FIG. 21 is displayed, and all image files which have not been registered in the image file server 209 and are stored in the work area in the photo site 105 are deleted in step S2013. The main menu dialog 1200 is then displayed in step S2016.

If it is determined in step S2012 that a file can be added, image information is registered in the DB server 208 in step S2014. That is, a record of the image information data table 900 in FIG. 9 is generated for the uploaded image file. In this record, using a value obtained by adding "1" to a maximum image ID registered so far as the image ID 901 of the added image, a file path to this image is set in the original image file path 904, file paths to the generated new thumbnail image and preview image are respectively set in the thumbnail file path 905 and preview image file path 906, "0" is set in the browse count 908, and "0" is set in the print count 909. Also, the album image data table 800 in which the album ID of the currently selected album is set in the album ID 801, the image ID is set in the image ID 802, and a value obtained by adding "1" to the number of images in the album is set in the image display number 803 is registered.

In step S2015, I is incremented by "1", and the flow returns to step S2007. By repeating the processes in steps S2007 to S2015 while I<N, the uploaded image files are registered on the database as long as the save size allows.

(Example of Album Browse Notification)

FIG. 16 shows a dialog displayed upon depression of the notification button 1205 on the main menu dialog 1200.

After the user inputs a destination mail address 1602, sender mail address 1603, mail title 1604, and message 1605 on a dialog 1600, if he or she presses a notification button 1606, the photo site 105 merges the above contents with a typical mail document prepared at the photo site 105, and sends an album notification mail message to the destination mail address.

FIG. 24 shows an example of the album notification mail message. The URL and album ID contained in this notification mail message have the same contents displayed on a URL & public album ID display field 1608 on the dialog 1600. Upon reception of the mail message, the user can browse an album by designating the URL described in that mail. Also, the user can browse the same album as that which can be browsed upon designating the URL when he or she inputs the album ID described in the mail message to the album ID designation field 1105 on the initial dialog 1100 and presses a GO! button 1106. The value of parameter AlbumID described in the URL is the same as the album ID of a public album.

Note that the public album ID is generated by encrypting the album ID managed in the photo site 105. In this way, the public album ID makes a third party harder to imagine the original album ID from its number or character string, and to analogize the public album IDs of other albums.

[Album Display Process]

Figure 25:
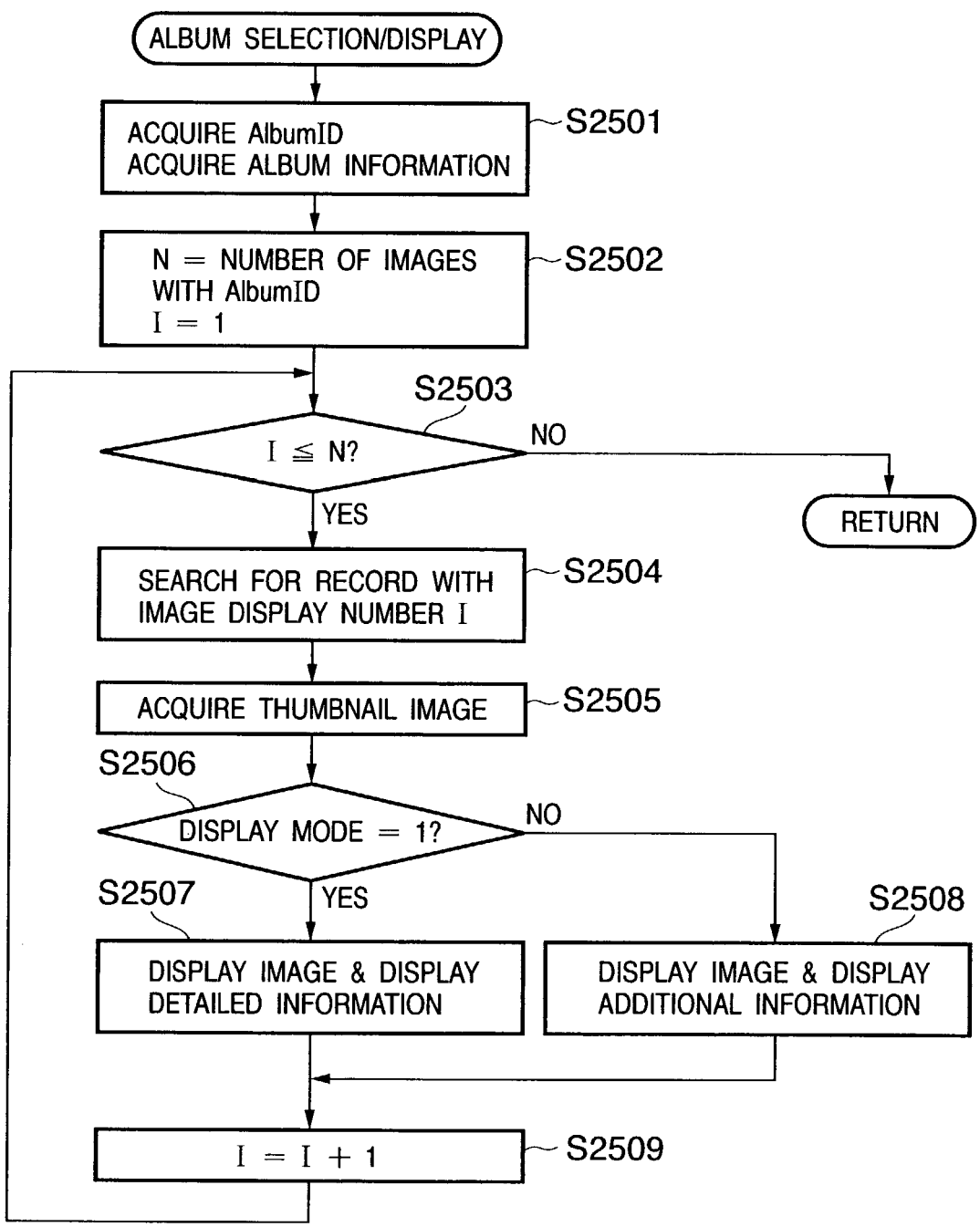
FIG. 25 is a flow chart showing album selection & display processes at the photo site according to the embodiment of the present invention.

FIG. 25 is a flow chart showing the process associated with selection and display of an album upon depression of one of the album select buttons 1211 to 1215 displayed within the album select field 1210 on the main menu dialog 1200.

The number of the pressed button from the head one is examined in step S2501, and the customer album data table 600 in the DB server 208 is searched for a record which has that number as the album display order number 603, thus acquiring the album ID 601 of that record as AlbumID. Also, a record of the album information data table 700 is specified based on that album ID 601 to extract album information.

In step S2502, the album image data table 800 in the DB server 208 is searched for all records each having AlbumID obtained in step S2501 as the album ID 801. The number of hit records as a result of search is set in N, and "1" is substituted in image count work variable I.

It is checked in step S2503 if I≦N. While I≦N, processes in steps S2504 to S2509 are repeated to display all images in the album.

In step S2504, the records of the album image data table 800, which are retrieved in step S2502, are searched for a record, which has I as the image display number 803, so as to obtain the image ID 802 of that image. After the image ID 802 is obtained, the image information data table 900 in the DB server 208 is searched for a record which has that image ID 802 as the image ID 901. In step S2505, a path to a thumbnail file of the image is acquired from the record retrieved in step S2504.

It is checked in step S2506 based on the album information data table 700 acquired in step S2501 if the value of the display mode number 709 is "1". In this embodiment, if this value is "0", it indicates thumbnail display; if it is "1", it indicates detailed display.

Figure 26:
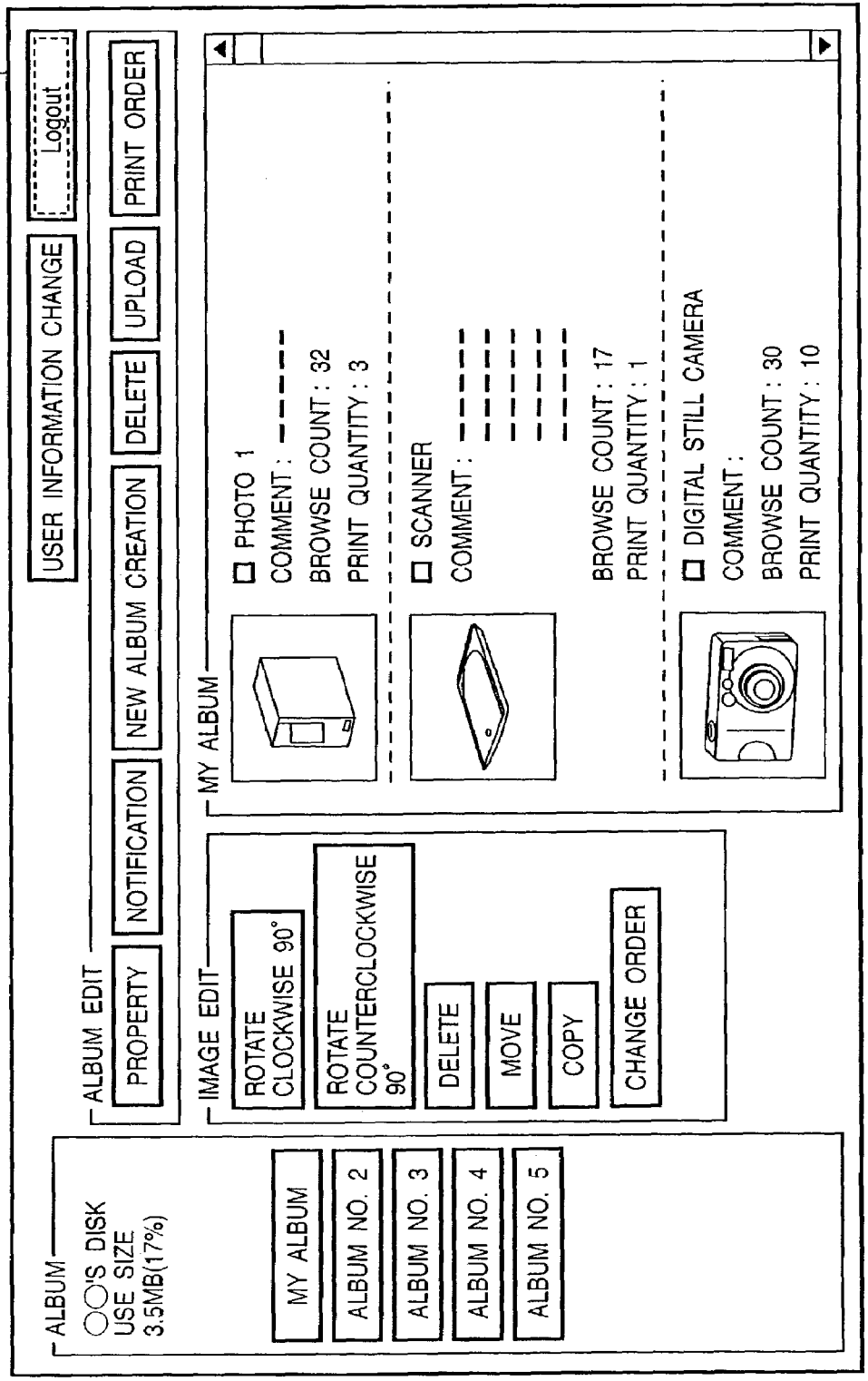
FIG. 26 shows an example of an album detail display dialog that the photo site according to the embodiment of the present invention provides to the user terminal.

If it is determined in step S2506 that the display mode is "1", a thumbnail image and detailed information of the image are displayed in step S2507. In this embodiment, an image name, comment, browse count, and print count extracted from the image information data table 900 are displayed as the detailed information, and an image edit check box is displayed together. A dialog 2600 shown in FIG. 26 shows an example of album display in the detailed display mode. Since this dialog 2600 is substantially the same as the main menu dialog 1200 except for the display method of the image display field 1223, a detailed description thereof will be omitted.

If it is determined in step S2506 that the display mode is not "1", a thumbnail image, image name, and image edit check box are displayed in step S2508. The main menu dialog 1200 shown in FIG. 12 is also an example in such simplified display mode.

If I>N in step S2503, since all images in the album are displayed, the process ends.

In this embodiment, only two display modes are explained. However, three or more display modes may be prepared.

<Example of Album Browse Process>

Figure 27:
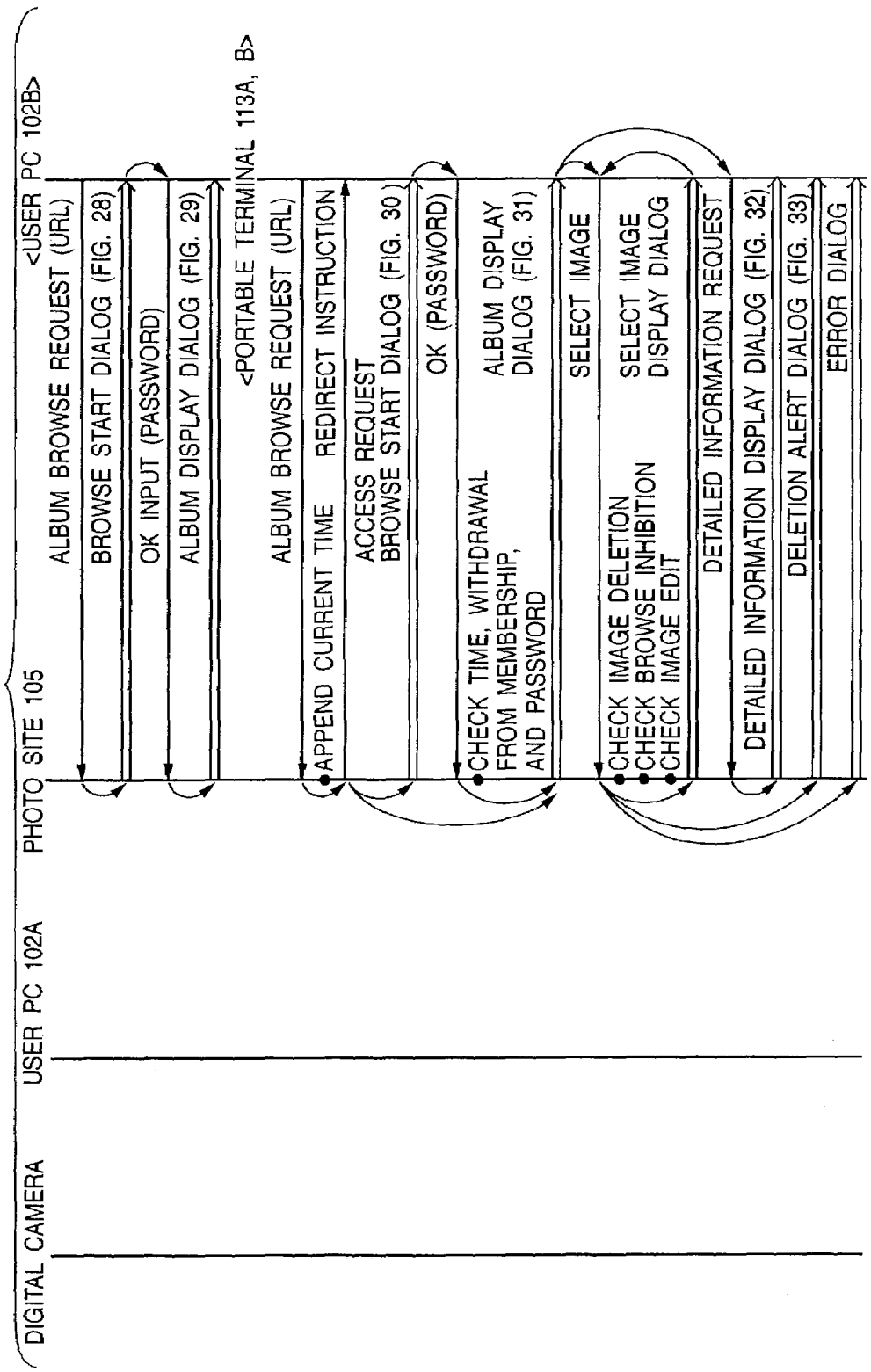
FIG. 27 shows an example of a protocol when the user PC or a mobile terminal according to the embodiment of the present invention issues an album browse instruction to the photo site.

FIG. 27 shows an example of a protocol between the user PC 102 or mobile terminal 113, and the photo site 105 when an album saved at the photo site 105 is browsed from the user PC 102B or mobile terminal 113.

(Album Browse from User PC)

Figure 28:
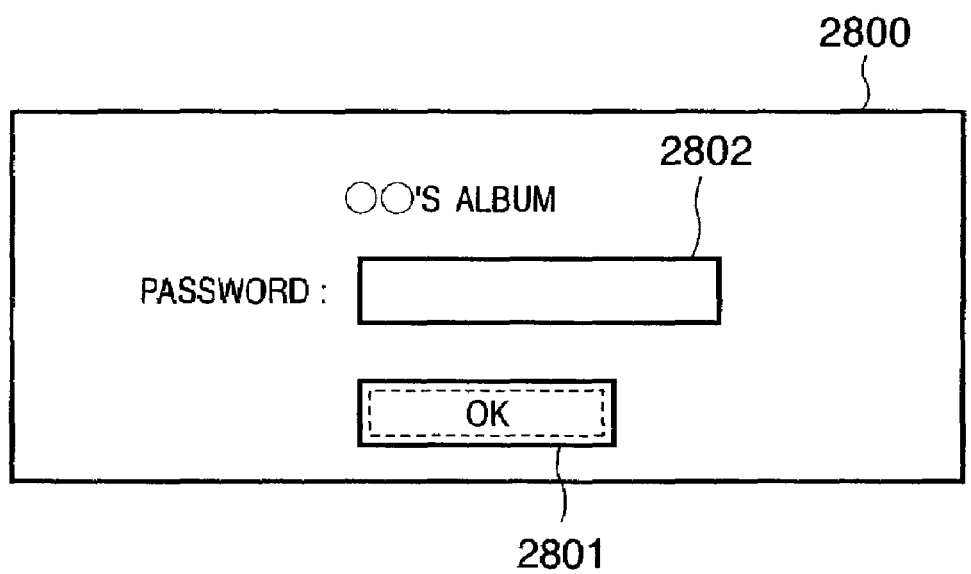
FIG. 28 shows an example of an album browse start dialog according to the embodiment of the present invention.

The user who received the notification mail shown in FIG. 24 can display an album browse start dialog 2800 shown in FIG. 28. Note that this dialog is also displayed when the user inputs an album ID 2402 described in the notification mail in the album ID input field 1105 on the initial dialog 1100 and presses the GO! button 1106.

When the photo site 105 finds a corresponding album by analyzing AlbumID in a parameter part of the input URL or the album ID input to the album ID input field 1105, it displays the name (last name) 405 on the dialog 2800 shown in FIG. 28. When it is determined based on the password certification flag 705 in the retrieved record of the album information data table 700 that the album is set with a password, a password input field 2802 is displayed. Note that no password input field 2802 is displayed for an album without any password.

Figure 29:
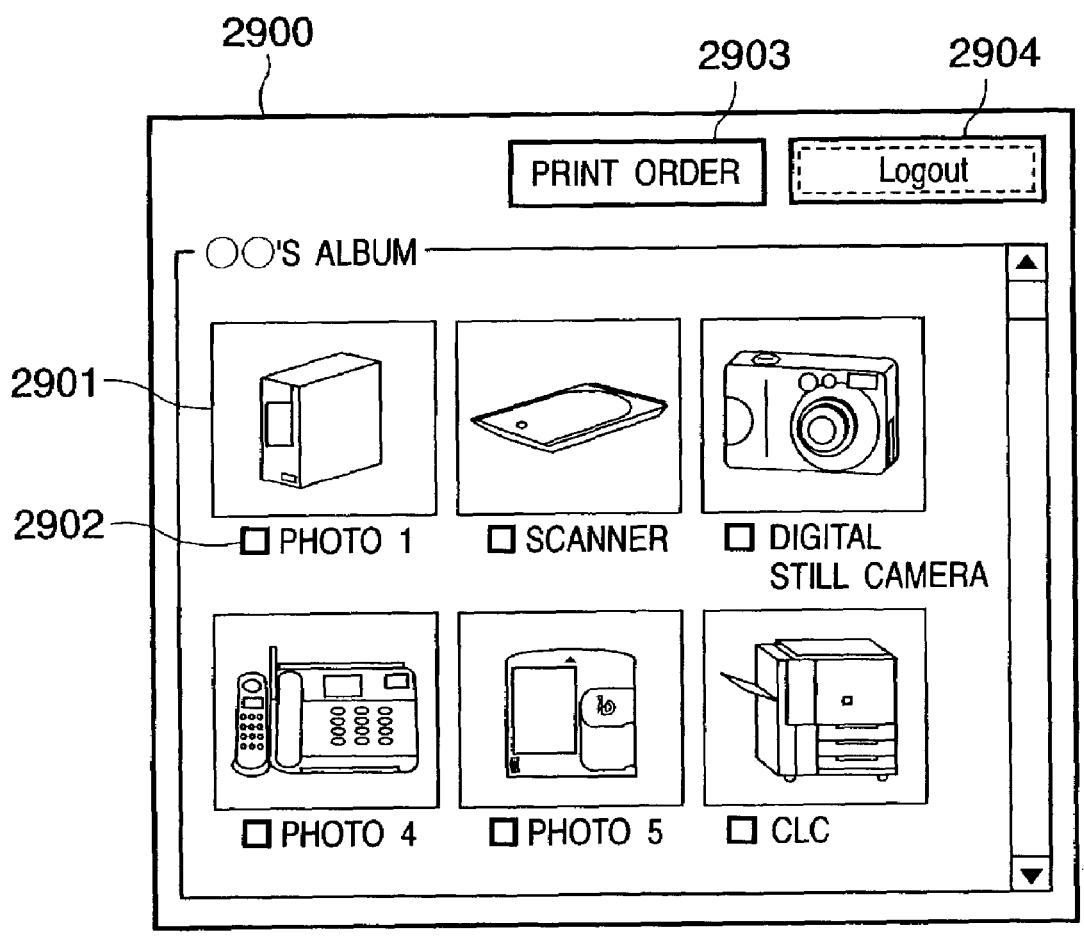
FIG. 29 shows an album browse dialog according to the embodiment of the present invention.

Upon depression of an OK button 2801, a dialog 2900 shown in FIG. 29 is displayed for the album without any password or the album whose password is correctly input. The contents of this dialog are the same as those of the album display field 1223 on the main menu dialog 1200. If a wrong password is input, an error dialog is displayed.

The value of the print allowability flag 707 is acquired from the album information data table 700, and if that value indicates that the album is printable, a button 2903 is displayed, and the user can place a print order.

In this embodiment, a copy process and session management process upon browsing an album from a mobile terminal will be explained as follows. Also, the copy process and session management process can be executed for album browse accesses from the user PC, and the same effect to be described below can be obtained. The present invention includes such modification.

(Album Browse from Mobile Terminal)

The mobile terminal application server 204 will be described in detail below.

FIGS. 30 to 33 show display examples of dialogs to be displayed on the display of the mobile terminal 113 when the user of the mobile terminal 113 browses images. This display layout changes depending on text wrap states due to different screen sizes of mobile terminal models, image sizes to be displayed, and the like.

Figure 30:
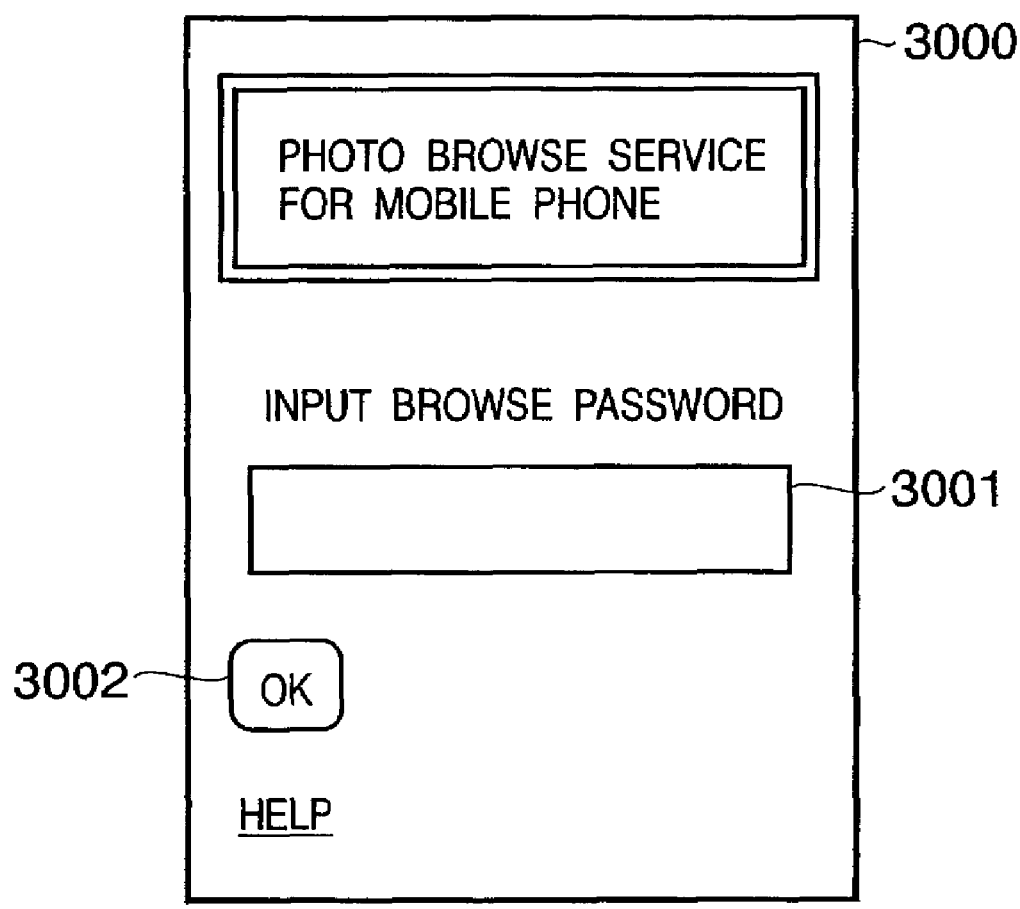
FIG. 30 shows an example of a login dialog that the photo site according to the embodiment of the present invention provides to the mobile terminal.
Figure 31:
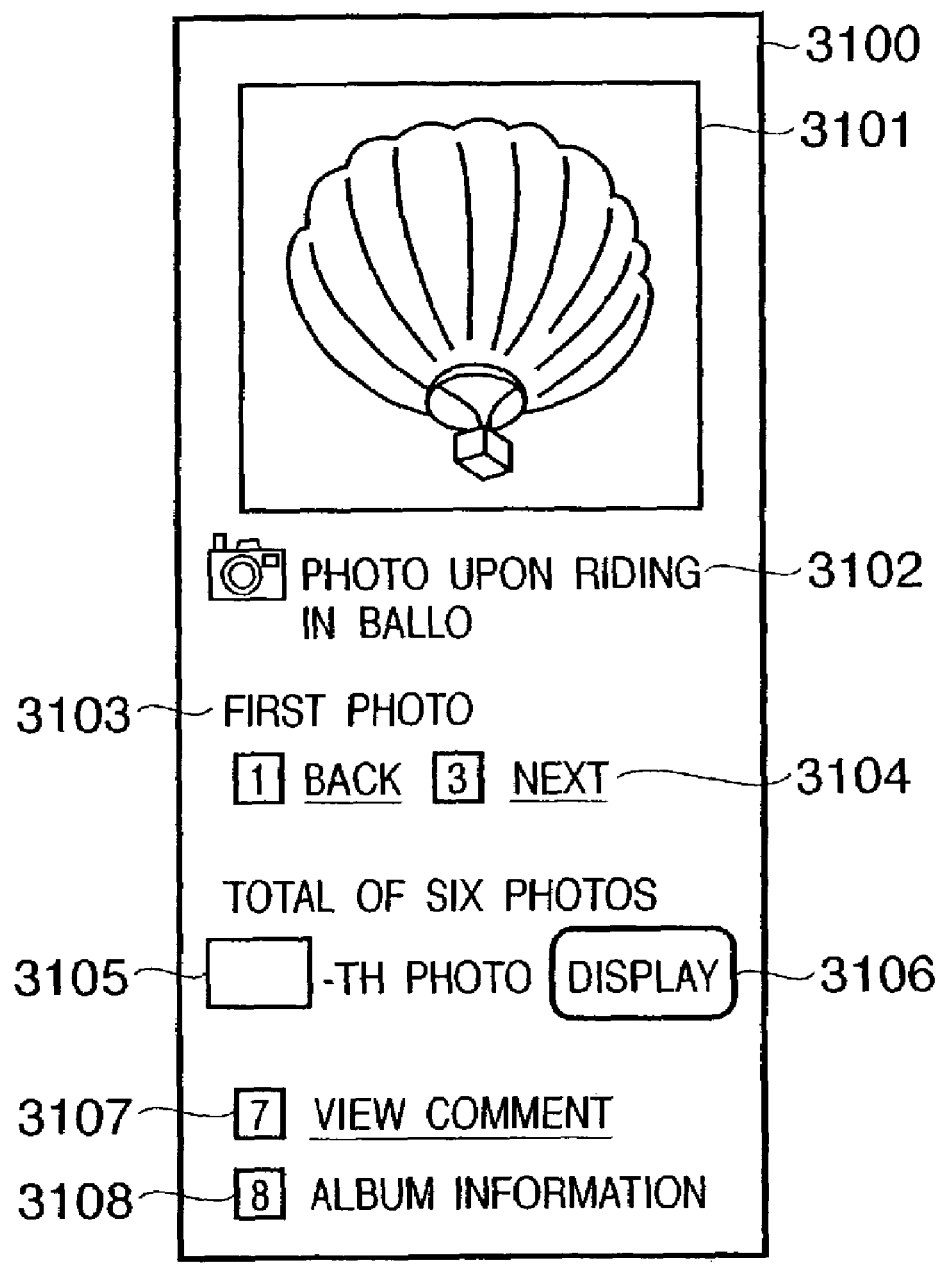
FIG. 31 shows an example of an initial dialog that the photo site according to the embodiment of the present invention provides to the mobile terminal.

When the mobile terminal user who received the notification mail shown in FIG. 24 designates the URL described in mail text, an album browse start dialog 3000 shown in FIG. 30 or dialog 3100 shown in FIG. 31 can be displayed.

Upon reception of an access request to the URL described in mail text from the mobile terminal 113, the application server 204 temporarily appends the current time in the system to a URL parameter, and then issues a redirect instruction to the mobile terminal 113. Upon reception of this instruction, the mobile terminal 113 issues an access request to the application server 204 again. In response to this request, the application server 204 analyzes AlbumID in a URL parameter part. If the server 204 determines by a processing flow to be described later that an album corresponding to AlbumID can be browsed, it further checks if a password is set for that album. If the password is set, the server 204 causes the terminal display to display the album browse start dialog 3000; otherwise, it causes the terminal display to display a dialog 3100 shown in FIG. 31.

When the mobile terminal user inputs a password to an input field 3001 of the album browse start dialog 3000, and presses an OK button 3002, the application server 204 displays the dialog 3100 only when it determines that the correct password is input. On the other hand, if a time-out is reached or if a wrong password is input, the server 204 displays an error dialog.

Figure 32:
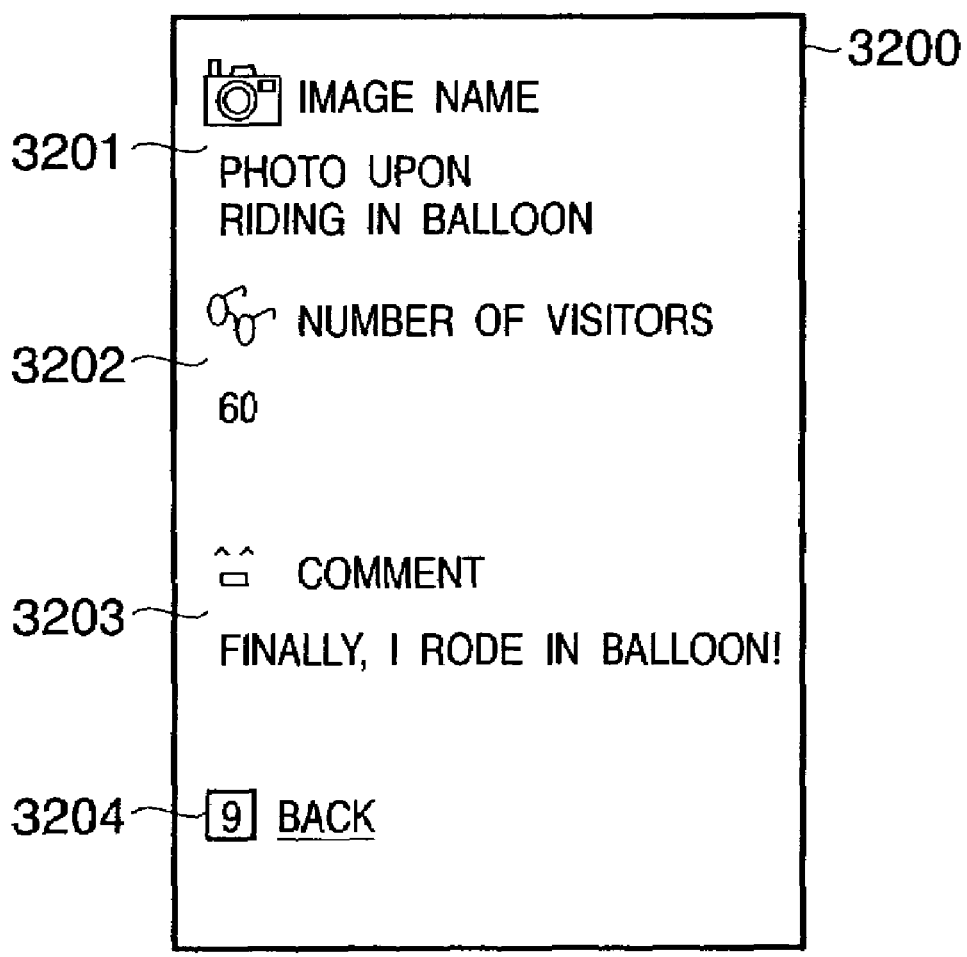
FIG. 32 shows an example of a display dialog of appended data (e.g., detailed information such as an image name, comment, and the like) associated with data that the photo site according to the embodiment of the present invention provides to the mobile terminal.

The dialog 3100 displays a thumbnail image 3101 with a reduced image size and its name 3102, an image order 3103 in the album, links 3104 used to select an image to be displayed, the total number of images in the album, an input field used to designate an image to be displayed using the image order and an input determination button 3106, a link 3107 used to display an image information display dialog 3200 shown in FIG. 32, and a link 3108 used to display an album information display dialog.

When the mobile terminal user presses one of the links 3104, an image before or after the currently displayed image is displayed on a display field of the image 3101, and the corresponding image name is displayed on a display field of the name 3102. When the mobile terminal user inputs an image order in the input field 3106 and presses the "display" button, an image of that image order is displayed on the display field of the image 3101, and the corresponding image name is displayed on the display field of the name 3102.

When the mobile terminal user presses the link 3107, the image information display dialog 3200 shown in FIG. 32 used to display detailed information such as an image name, comment, the number of viewers of the image, and the like is displayed. When the mobile terminal user presses the link 3108, the album information display dialog (not shown) used to display detailed information such as an album name, comment, the number of viewers of the album, and the like is displayed.

The application server 204 checks the state in the album at the depression timing of the links 3104 or "display" button 3106. When the next image to be displayed has already been deleted from the album, the server 204 displays a dialog 3300.

On the other hand, if a browse inhibition flag is set for the image, an error dialog is displayed. The dialog 3200 displays a detailed image name 3201, the number 3202 of viewers of the image, a comment 3203, and a link 3204 used to go back to the dialog 3100. The album information display dialog (not shown) has similar display contents to those on the dialog 3200, but displays the album name in place of the image name, the number of viewers of the album in place of the number of viewers of the image, and the album comment in place of the image comment.

Figure 33:
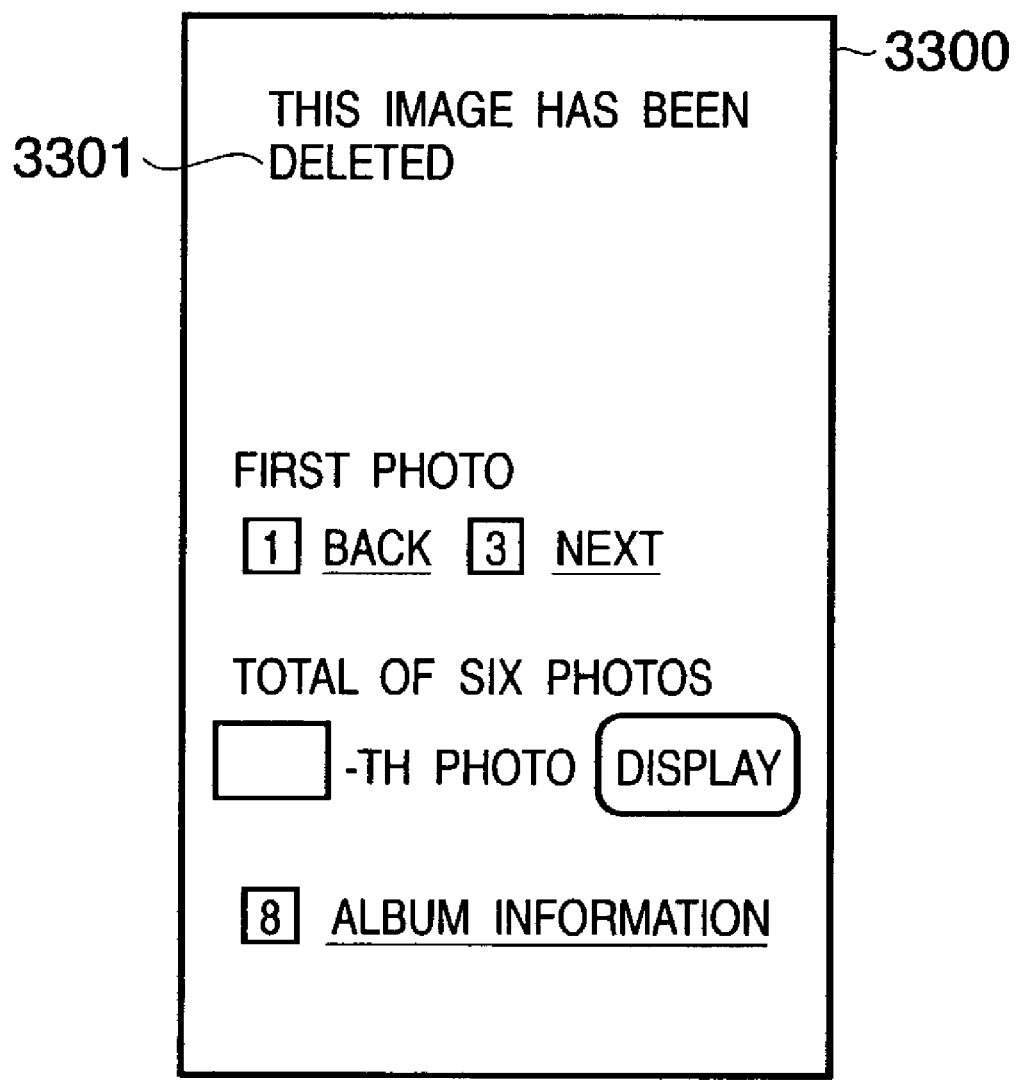
FIG. 33 shows an example of a data deletion notification dialog that the photo site according to the embodiment of the present invention provides to the mobile terminal.

The dialog 3300 shown in FIG. 33 displays a comment 3301 "this image has been deleted" in place of the image 3101 and image name 3102 of the dialog 3100. Also, the dialog 3300 does not display any link used to display the image information display dialog 3200. Since other display contents are the same as those in FIG. 31, a description thereof will be omitted.

<Configuration of Database for Mobile Application>

FIGS. 34 to 36 show the contents of tables which are managed by the mobile terminal application server 204 in the DB server 208. The application server 204 generates these tables in response to access from the mobile terminal 113, and uses them to control display contents and services to the mobile terminal 113.

FIG. 34 shows a table used to manage access from each mobile terminal 113.

This MB session information table 3400 is registered for one record per new access in the DB server 208. In this case, a uniquely defined session ID 3401 is assigned as identification information of a mobile terminal user who made access, and is stored in the table together with the user ID 3404 (=user ID 501) of an album owner who submitted the browse notification mail.

The MB session information table 3400 stores a date & time 3403 at the time of new access, and a last access date & time 3402 using the identical session ID. The application server 204 periodically searches the MB session information table 3400 in the DB server 208, and sets a flag in the record attribute 3405 of a record for which a predetermined period of time has elapsed from the last access date & time. The server 204 processes access from the mobile terminal 113, which uses the session ID in that record, as a time-out, and denies that access.

FIG. 35 shows a table used to store information of an album designated upon receiving an album browse request from the mobile terminal 113.

This MB album information table 3500 is recorded for one recorded per new access in the DB server 208. In this case, the session ID 3501 stored in the MB session information table 3400, the album ID 3502 designated from the mobile terminal 113, and copies 3503-3504 of some contents of the album information data table 700 are stored in this table.

FIG. 36 shows a table used to store image information in an album designated upon receiving an album browse request from the mobile terminal 113.

In response to each new access, records corresponding in number to images contained in an album are registered in an MB image information table 3600 in the DB server 208. In this case, the table stores the session ID 3601 stored in the MB session information table 3400, and copies 3602-3606 and 3607 of some contents of the corresponding records of the album image data table 800 and image information data table 900. Furthermore, the application server 204 temporarily acquires each image in the file server 209, which is designated by the thumbnail file path 905 in the image information data table 900, and copies that image to a temporary area in the file server 209, which is exclusively used by the application server 204. The server 204 stores a file path to the copied image in an image path 3606 in the MB image information table 3600.

<Browse Control Flow Chart>

Figure 37:
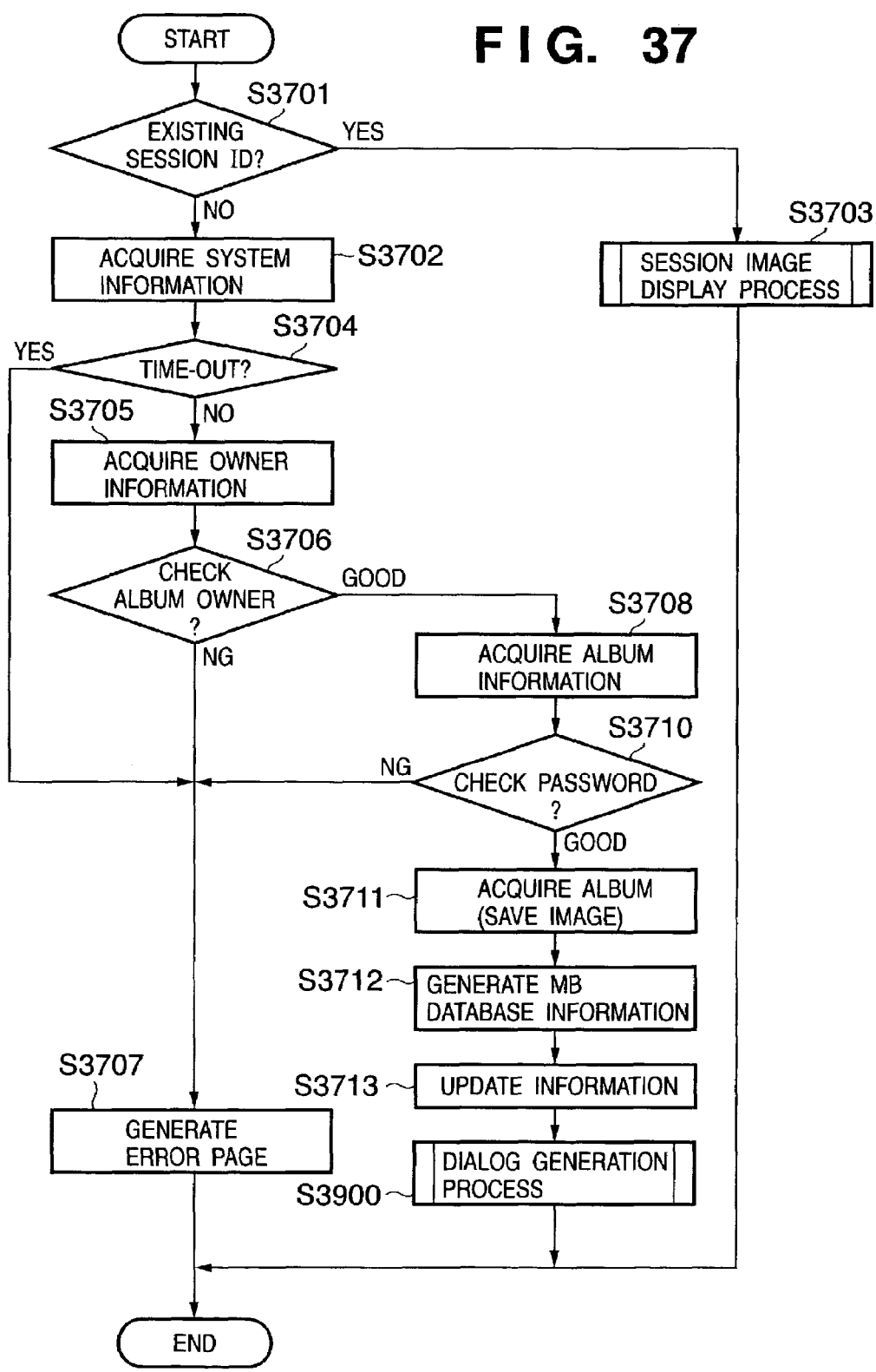
FIG. 37 is a flow chart showing the process executed when the photo site according to the embodiment of the present invention provides a dialog 3100 of FIG. 31 on the mobile terminal.

FIG. 37 is a flow chart showing the processing sequence when the application server 204 displays the dialog 3100 on the mobile terminal.

Upon receiving an album browse request from the mobile terminal 113, the application server 204 detects a session ID from a URL parameter part of the album browse request in step S3701, and searches the MB session information table 3400 to see if that session ID already exists. If it is determined that the session ID already exists, the server 204 determines the second or subsequent access using the identical session ID, and executes a session image display process in step S3703. On the other hand, if the detected session ID does not hit, the server 204 determines the first image browse display process, and acquires the standard time in the photo site 105 by acquiring system information in step S3702.

In step S3704, the server 204 compares time information appended to the URL parameter part with the time acquired in step S3702. If a given time period has elapsed from that time information after access, the server 204 determines a time-out, and causes the terminal display to display an error page in step S3707. In this way, the photo site 105 can deny access using a URL previously bookmarked at the mobile terminal 113.

If no time-out is detected, the server 204 analyzes AlbumID appended to the URL parameter part in step S3705 from the last access date. The server 204 searches the customer album data table 600 and customer information data table 400 using this AlbumID as a key to acquire corresponding records. The server 204 determines in step S3706 whether or not the album owner has withdrawn from membership. If the album owner has withdrawn from membership, the server 204 generates an error page in step S3707.

If the album owner has not withdrawn from membership, the server 204 retrieves a corresponding record of the album information data table 700 based on the acquired information in step S3708, and checks the information and password in the URL parameter and confirms the album publication allowability flag and album browse allowability flag in step S3710. If an error has occurred, the server 204 generates an error page in step S3707.

If no error occurs, the server 204 retrieves corresponding records of the album image data table 800 and image information data table 900 as information that pertains to images contained in the album on the basis of the retrieved information in the record of the album information data table 700 in step S3711. In this case, the server 204 temporarily acquires each image in the file server 209 designated by the thumbnail image file path 905, and copies it to a temporary area (in the file server 209) exclusively used for access from the mobile terminal 113.

In step S3712, the server 204 generates records in the MB session information table 3400, MB album information table 3500, and MB image information table 3600, and stores the acquired information and copied image path information in these records. Note that the server 204 assigns a uniquely defined session ID as management information of the user who made access, and stores it together with the user ID (=user ID 501) of the owner who submitted the browse notification mail.

In step S3713, the server 204 reflects an access count from the mobile terminal 113 to the contents of the mobile browse count fields 712 and 910 in the album information data table 700 and image information data table 900. In step S3900, the server 204 generates data of the dialog 3100.

Figure 38:
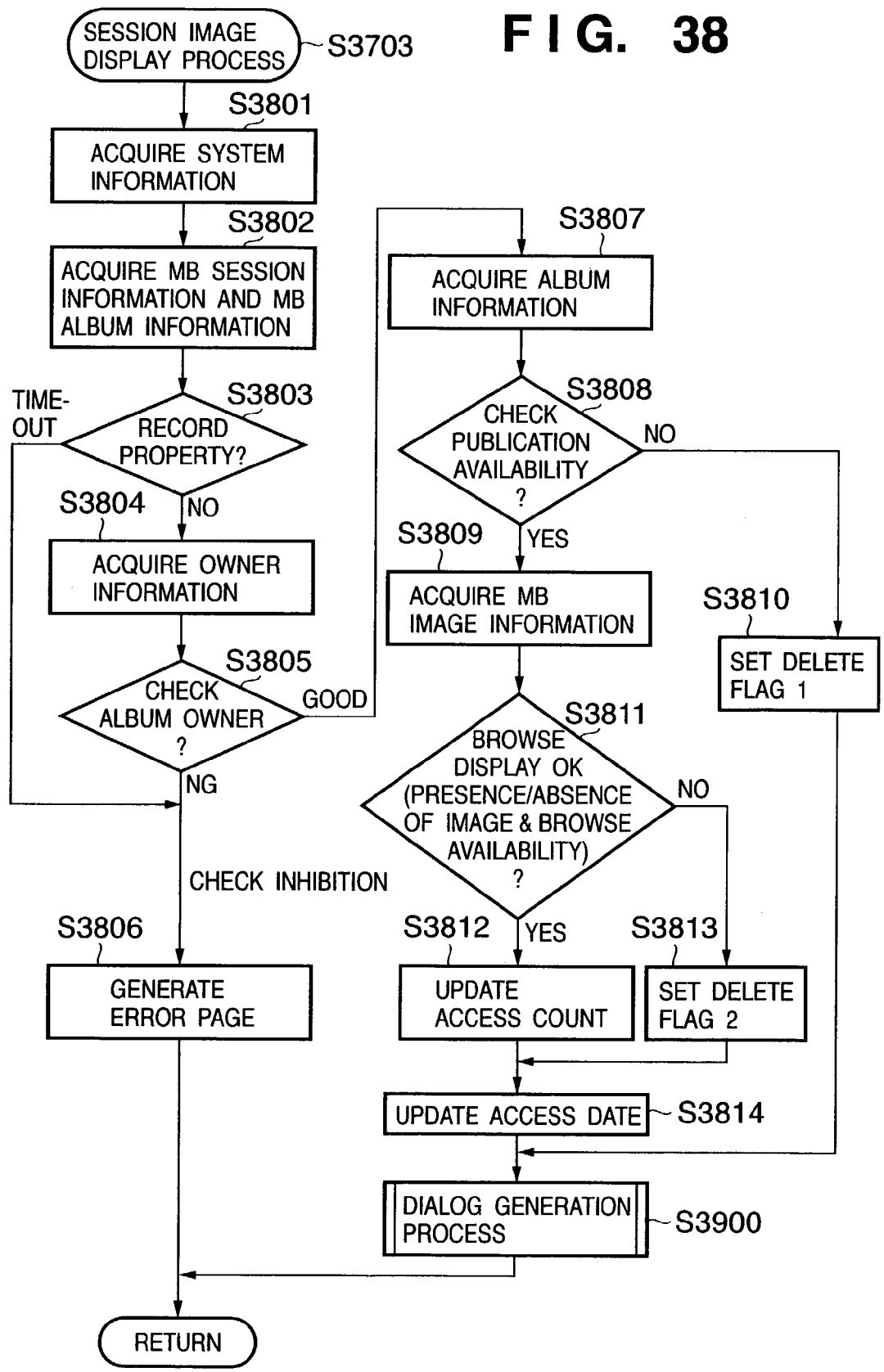
FIG. 38 is a flow chart showing the process executed when the photo site according to the embodiment of the present invention causes the mobile terminal to display the dialog 3100 of FIG. 31.

FIG. 38 is a flow chart showing details of a process (S3703) executed when the session information has already been generated upon the application server 204 causing the mobile terminal to display the dialog 3100 shown in FIG. 31.

In step S3801, the server 204 acquires the standard time in the photo site 105 by acquiring system information. In step S3802, the server 204 analyzes session ID appended to a URL parameter part. The server 204 searches the MB session information table 3400 and MB album information table 3500 using the acquired session ID as a key to acquire corresponding records. The URL parameter part contains the AlbumID and user ID.

In step S3803, the server 204 checks the record property in the record of the MB session information table 3400. If the record property indicates access before a given period of time or more, the server 204 determines a time-out, and causes the terminal display to display an error page in step S3806. In this manner, the photo site 105 can deny access using a URL previously bookmarked at the mobile terminal 113. Furthermore, the server 204 searches the customer information data table 400 for a corresponding record in step S3804, and confirms in step S3805 whether or not the album owner is registered as an authentic user. If the album owner is not registered as an authentic user, the server 204 generates an error page in step S3806.

If the album owner is registered as an authentic user, the server 204 retrieves a corresponding record of the album information data table 700 based on the session information in step S3807, and confirms the album publication allowability flag and browse allowability flag in step S3808. If the album can be published, the server 204 retrieves records of the MB image information table 3600 in step S3809. On the other hand, if the album is inhibited from being published, the server 204 sets delete flag 1, and the flow advances to step S3900 to execute a dialog generation process.

Whether or not an image is present in the image information data table 900 and its browse allowability flag are confirmed in step S3811. If the image can be browsed, the server 204 updates a mobile browse count from the mobile terminal 113 in step S3812. On the other hand, if that image cannot be browsed, the server 204 determines that the image has been deleted, and sets delete flag 2 in step S3813.

In step S3814, the server 204 reflects the access date in the last login date in the MB session information table 3400. The flow then advances to step S3900 to execute a dialog generation process, thus generating information of the dialog 3100 as a display dialog for the second or subsequent access.

Figure 39:
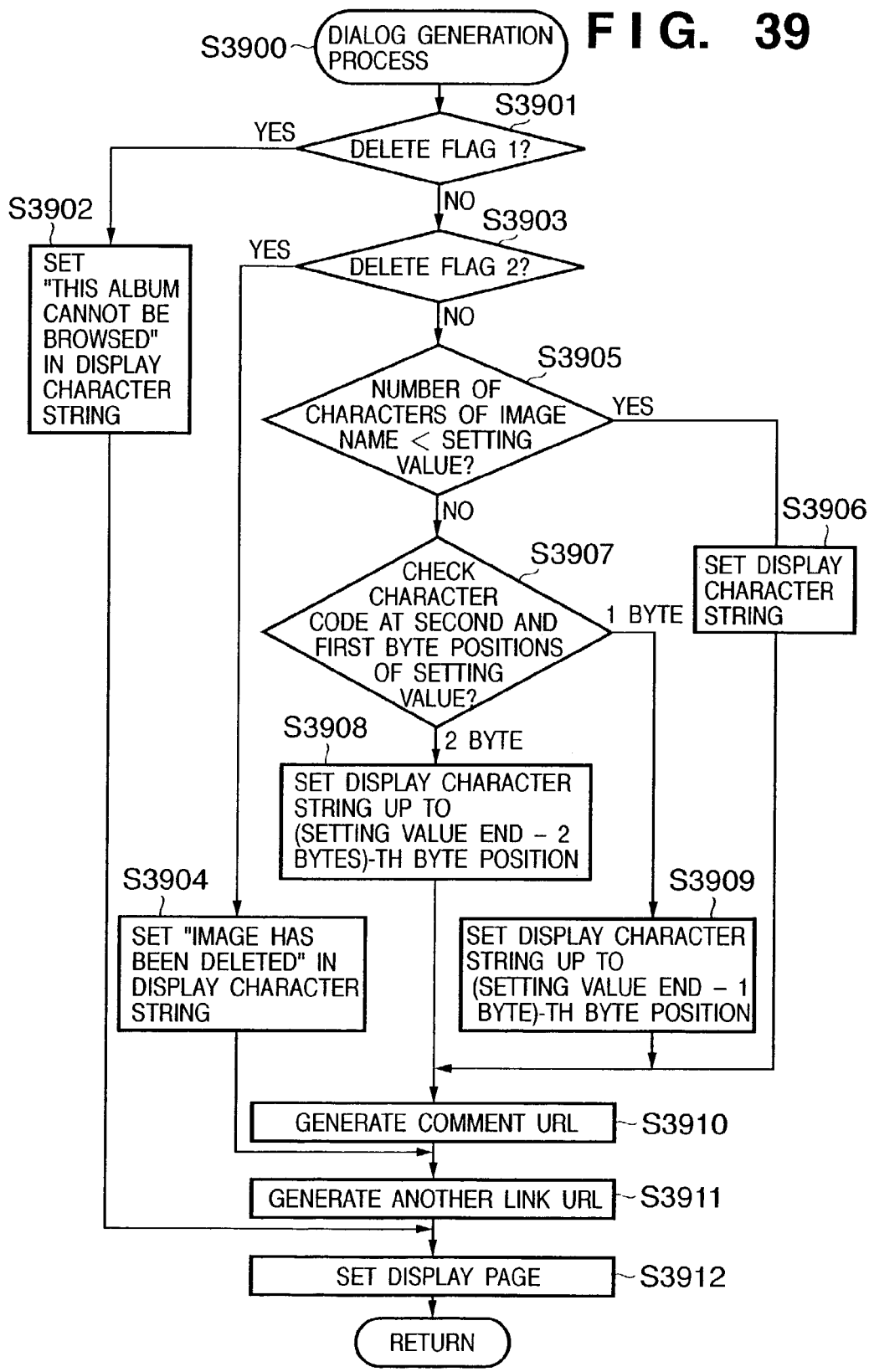
FIG. 39 is a flow chart showing the process (S3900) for generating data required when photo site according to the embodiment of the present invention displays the dialog 3100 of FIG. 31 on the mobile terminal.

FIG. 39 is a flow chart showing details of the process (S3900) for generating data required to display the dialog 3100.

In steps S3901 and S3903, delete flags 1 and 2 are inspected. If these flags are set, corresponding error display character strings are set in steps S3902 and S3904.

If neither of these flags are set, the number of characters of the image name stored in the MB image information table 3600 is compared with a display size (DispCh) which is set in advance, in step S3905.

Note that the DB server 208 of the photo site 105 manages display sizes (DispCh) that can be displayed by respective mobile terminal models, and the mobile application server 204 reads out the display size corresponding to the model notified from the mobile terminal 113 to make the above comparison.

If the number of characters is smaller than the setting value, the image name in the MB image information table 3600 is set in a character string of the image name 3102 on the dialog 3100 in step S3906. On the other hand, if it is determined that the number of characters is larger than the setting value, a character at the first and second byte positions at the end of a [display size (DispCh)] part of the image name character string is checked in step S3907 to see if that character is a 2-byte code character.

If a 2-byte code character is present at the end of the [display size (DispCh)] part of the image name character string, a character string up to the (display size (DispCh) −2 bytes)-th byte position obtained by excluding a character at the boundary position is set in a character string of the image name 3102 on the dialog 3100 in step S3908. On the other hand, if a 1-byte code character is present at the end of the [display size (DispCh)] part of the image name character string, a character string up to the (display size (DispCh) −1 byte)-th byte position obtained by excluding a character at a boundary position is set in a character string of the image name 3102 on the dialog 3100 in step S3909. The image name 3102 on the dialog 3100 in FIG. 31 is displayed under the restriction of the display size, and a character string "photo upon riding in ballo" is displayed by modifying a character string "photo upon riding in balloon" by the photo site 105. A full character string "photo upon riding in balloon" is displayed as the image name 3201 on the dialog 3200 in FIG. 32 without any modification. Also, various kinds of information (e.g., the number of viewers, a comment to an image, and the like) associated with image data are displayed on the dialog 3200.

In step S3910, the link information 3107 on the dialog 3100 is generated in a format containing session information. Furthermore, the URL of an image, another link information, parameters associated with a form, and the like of the dialog 3100 are generated in a format including session information in step S3911. In step S3912, the dialog information is output together. If the image has been deleted in step S3904, data that represents the dialog 3300 is finally generated.

In this embodiment, the name of image data is modified. Also, it is possible to display image data and the appended data within a page (dialog). Further, information associated with image data such as a comment to image data, the owner name of image data, the number of visitors, and the like is similarly processed.

(Another Embodiment)

In this embodiment, an image network service using a digital still camera has been exemplified. However, the present invention can be applied to any other services that deliver images and their information. Furthermore, as described above, the present invention is not limited to an image browse system, and provides a technique that can be widely applied to mobile phone services connected to an external apparatus such as a server or the like via a communication line. The scope of the present invention includes such modifications. Moreover, as described above, the copy process and session management process of saved information have been explained taking a mobile phone service as an example. However, the copy process and session management process of saved information can be applied to image browse accesses from general information terminals and information processing apparatuses such as PCs and the like, and the same effect as in the above embodiment can be obtained. The present invention includes such modification.

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores the program codes corresponding to the aforementioned flow charts.

As many apparently widely different embodiments of the present invention can be made without departing from the spirit and scope thereof, it is to be understood that the invention is not limited to the specific embodiments thereof except as defined in the appended claims.

What is claimed is:

1. A photo site apparatus for uploading image data from a first communication terminal and providing the image data to a second communication terminal via a network, comprising:
    a central processing unit (CPU);
    a text data reception unit that receives, from said first communication terminal, text data to be appended to image data uploaded from the first communication terminal;
    a display request reception unit that receives a request to display an image represented by the uploaded image data from the second communication terminal;
    an inspection unit that inspects whether the uploaded image data representing the image requested to be displayed is inhibited from being published or not;
    an acquisition unit that acquires a display size of said second communication terminal, when said inspection unit inspects that the uploaded image data representing the image requested to be displayed is not inhibited from being published;
    an extraction unit that extracts a string of characters from the text data appended to the uploaded image data representing the image requested to be displayed, said string of characters having the acquired display size of said second communication terminal;
    a determination unit that determines whether a last character of the extracted string of characters consists of multiple bytes;
    a creation unit that creates first display information for a first screen to be displayed, including data of the extracted string of characters except the last character of the extracted string of characters: and the uploaded image data representing the image requested to be displayed, and link data linking to second display information for a second screen to be displayed, including all character strings of the text data appended to the uploaded image data without the uploaded image data representing the image, when said inspection unit inspects that the uploaded image data representing the image requested to be displayed is not inhibited from being published and said determination unit determines that the last character of the extracted string of characters consists of multiple bytes, and creates error display information for an error screen to be displayed, including error display character strings, when said inspection unit inspects that the uploaded image data representing the image requested to be displayed is inhibited from being published; and
    a transmission unit that transmits the created first display information or the created error display information to said second communication terminal, wherein said transmission unit further transmits the second display information to the second communication terminal in response to an access using the link data from the second communication terminal.

2. The apparatus according to claim 1, wherein said text data includes at least one of a file name of the uploaded image data, a comment to the uploaded image data, an owner name of the uploaded image data, and the number of viewers of the image represented by the uploaded image data.

3. The apparatus according to claim 1, further comprising:
    a copy unit that generates copy information by copying the uploaded image data and the text data; and
    a session management unit that issues a session ID for first access from the second communication terminal, and manages the session ID and the generated copy information in association with each other,
    wherein said extraction unit extracts the string of characters from the copy information.

4. An information processing method performed by a photo site apparatus for uploading image data from a first communication terminal and providing the image data to a second communication terminal via a network, comprising the steps of:
    receiving, from said first communication terminal, text data to be appended to image data uploaded from the first communication terminal;
    receiving a request to display an image represented by the uploaded image data from the second communication terminal;
    inspecting whether the uploaded image data representing the image requested to be displayed is inhibited from being published or not;
    acquiring a display size of said second communication terminal, when said inspecting step inspects that the uploaded image data representing the image requested to be displayed is not inhibited from being published;
    extracting a string of characters from the text data appended to the uploaded image data representing the image requested to be displayed, said string of characters having the acquired display size of said second communication terminal;
    determining whether a last character of the extracted string of characters consists of multiple bytes;
    creating first display information for a first screen to be displayed, including data of the extracted string of characters except the last character of the extracted string of characters a the uploaded image data representing the image requested to be displayed, and link data linking to second display information for a second screen to be displayed, including all character strings of the text data appended to the uploaded image data without the uploaded image data representing the image, when said inspecting step inspects that the uploaded image data representing the image requested to be displayed is not inhibited from being published and said determining step determines that the last character of the extracted string of characters consists of multiple bytes, and creating error display information for an error screen to be displayed, including error display character strings, when said inspecting step inspects that the uploaded image data representing the image requested to be displayed is inhibited from being published; and transmitting the created first display information or the created error display information to said second communication terminal, wherein said transmitting step further transmits the second display information to the second communication terminal in response to an access using the link data from the second communication terminal.

5. A computer-readable storage medium on which is stored a computer-executable program that executes an information processing method by a photo site apparatus for uploading image data from a first communication terminal and providing the image data to a second communication terminal via a network, the program comprising the steps of:

receiving, from said first communication terminal, text data to be appended to image data uploaded from the first communication terminal;

receiving a request to display an image represented by the uploaded image data from the second communication terminal;

inspecting whether the uploaded image data representing the images requested to be displayed is inhibited from being published or not;

acquiring a display size of said second communication terminal, when said inspecting step inspects that the uploaded image data representing the image requested to be displayed is not inhibited from being published;

extracting a string of characters from the text data appended to the uploaded image data representing the image requested to be displayed, said string of characters having the acquired display size of said second communication terminal;

determining whether a last character of the extracted string of characters consists of multiple bytes;

creating first display information for a first screen to be displayed, including data of the extracted string of characters except the last character of the extracted string of characters and the uploaded image data representing the image requested to be displayed, and link data linking to second display information for a second screen to be displayed, including all character strings of the text data appended to the uploaded image data without the uploaded image data representing the image, when said inspecting step inspects that the uploaded image data representing the image requested to be displayed is not inhibited from being published and said determining step determines that the last character of the extracted string of characters consists of multiple bytes, and creating error display information for an error screen to be displayed, including error display character strings, when said inspection step inspects that the uploaded image data representing the image requested to be displayed is inhibited form being published; and transmitting the created first display information or the created error display information to said second communication terminal, wherein said transmitting step further transmits the second display information to the second communication terminal in response to an access using the link data from the second communication terminal.

* * * * *